(12) United States Patent
Duan et al.

(10) Patent No.: US 12,047,935 B2
(45) Date of Patent: Jul. 23, 2024

(54) CELLULAR COMMUNICATIONS UNDER RADAR INTERFERENCE

(71) Applicant: QUALCOMM Incorporated, San Diego, CA (US)

(72) Inventors: Weimin Duan, San Diego, CA (US); Alexandros Manolakos, Escondido, CA (US); Seyong Park, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 519 days.

(21) Appl. No.: 17/410,753

(22) Filed: Aug. 24, 2021

(65) Prior Publication Data
US 2022/0095319 A1    Mar. 24, 2022

Related U.S. Application Data

(60) Provisional application No. 63/081,191, filed on Sep. 21, 2020.

(51) Int. Cl.
*H04W 72/12* (2023.01)
*G01S 7/02* (2006.01)
*H04L 5/00* (2006.01)
*H04W 72/1268* (2023.01)
(Continued)

(52) U.S. Cl.
CPC ......... *H04W 72/1215* (2013.01); *G01S 7/023* (2013.01); *H04L 5/0048* (2013.01); *H04W 72/1268* (2013.01); *H04W 72/569* (2023.01); *H04W 88/10* (2013.01)

(58) Field of Classification Search
CPC ........ G01S 13/003; G01S 7/006; G01S 7/023; G01S 7/0232; G01S 7/0235; H04K 2203/16; H04K 3/25; H04L 5/0048; H04L 5/0051; H04L 5/0094; H04W 16/14;
(Continued)

(56) References Cited

U.S. PATENT DOCUMENTS

2018/0003816 A1* 1/2018 Olson .................. G01S 13/933

FOREIGN PATENT DOCUMENTS

WO    2017205874 A1    11/2017

OTHER PUBLICATIONS

International Search Report and Written Opinion—PCT/US2021/047470—ISA/EPO—Nov. 29, 2021.

\* cited by examiner

*Primary Examiner* — Nader Bolourchi
(74) *Attorney, Agent, or Firm* — Weaver Austin Villeneuve & Sampson LLP/QUALCOMM

(57) ABSTRACT

Methods of reducing the interferences of radar signals with uplink or downlink data communication signals in a wireless system for both data communication and radar sensing may include configuring the transmitters of the radar signals and the data communication signals such that the data communication signals and the radar signals are transmitted using different radio frequency resources, and/or configuring the receivers of the data communication signals to receive the data communication signals using a receive beam that does not collide with radar beams. The methods may also include using a reference signal for both downlink data communication and radar sensing and/or determining a Quasi-Colocation (QCL) configuration for downlink data reception based on information regarding a radar beam.

31 Claims, 15 Drawing Sheets

(51) Int. Cl.
 *H04W 72/566* (2023.01)
 *H04W 88/10* (2009.01)
(58) Field of Classification Search
 CPC ......... H04W 72/1215; H04W 72/1268; H04W 72/27; H04W 72/569; H04W 88/10; H04W 92/20
 See application file for complete search history.

CELLULAR COMMUNICATIONS UNDER RADAR INTERFERENCE

CROSS-REFERENCE TO RELATED APPLICATIONS

This application claims the benefit of and priority to U.S. Provisional Application No. 63/081,191, filed Sep. 21, 2020, entitled "CELLULAR COMMUNICATIONS UNDER RADAR INTERFERENCE," which is assigned to the assignee hereof and which is incorporated herein by reference in its entirety.

BACKGROUND

In wireless communication systems, such as cellular communication systems, Radio Access Technologies (RATs) may use higher and higher bandwidth for data communication and other applications. For example, in Fifth Generation (5G) New Radio (NR), Six Generation (6G), and beyond, more and more applications and services may be introduced into the wireless communication system to fully utilize the allocated bandwidth. In one example, a cellular communication system may be used for both wireless communications and radar sensing, where base stations in the cellular communication system may serve as radar transmitters and/or receivers for radar sensing using the cellular RF spectrum resource. The coexistence of data communication and radar sensing in the allocated frequency band in a cellular communication system may cause significant interference between the data communication signals and radar sensing signals in the cellular communication system.

SUMMARY

Techniques disclosed herein relate generally to wireless systems, and more specifically to wireless systems for joint wireless communication and RF sensing. Various inventive embodiments for reducing interferences between wireless communication signals and radar sensing signals are described herein, including devices, systems, components, apparatuses, methods, procedures, instructions, code, computer storage medium, and the like.

According to certain aspects, a method may include sending, by a first base station to a second base station (e.g., via a radar server), a list of resources for uplink data transmission from a user equipment (UE) to the first base station; receiving, using resources other than those included in the list of resources, radar signals from the second base station; and receiving, using the list of resources, uplink data from the UE.

In some aspects, the list of resources may include a list of frequency domain and time domain resources for transmitting radio frequency signals, such as different slots, symbols, and carrier frequencies. In some aspects, the method may further include sending a respective priority level associated with each resource of the list of resources to the radar server. The radar server may determine, based on the respective priority level, a schedule for muting the second base station, and sending the schedule for muting the second base station to the second base station. In some aspects, the uplink data may include Ultra-Reliable Low-Latency Communication (URLLC) data. The first base station may be a serving base station for the UE and also a radar receiver of a bistatic radar with the second base station as the radar transmitter. The first base station may include a base station for Long-Term Evolution (LTE), Fifth Generation (5G) New Radio (NR), or Sixth Generation (6G) Radio Access Technologies (RATs).

According to certain aspects, a method may include, by a first base station, receiving, from a radar server, information regarding a radar beam transmitted by a second base station serving as a radar transmitter; determining, using the information regarding the radar beam, parameters of a receive beam for receiving uplink data from a User Equipment (UE), wherein the parameters are determined such that the receive beam does not collide with the radar beam; receiving, using the receive beam, the uplink data; and receiving, the radar beam from the second base station.

In some aspects, the information regarding the radar beam may include at least one of a boresight direction, a beam width, or an uncertainty of the beam width of the radar beam. In some aspects, the method may also include determining, based on the information regarding the radar beam, a default receive beam for uplink data communication, where the default receive beam may not collide with the radar beam. In some aspects, receiving the uplink data using the receive beam may include configuring an antenna array to form the receive beam. In some aspects, the information regarding the radar beam may be included in assistance data.

According to certain aspects, a method may include, by a first base station serving as both a radar transmitter and a serving base station for a User Equipment (UE), scheduling communication signals that include downlink data and a reference signal, where the reference signal is usable for both downlink data communication and radar sensing; sending (e.g., via a radar server) information regarding the reference signal to a second base station serving as a radar receiver; and transmitting, by the first base station, the communication signals that include the downlink data and the reference signal to the UE and to at least one of the second base station or a radar target.

In some aspects, the reference signal may include at least one of a channel state information reference signal (CSI-RS), positioning reference signal (PRS), demodulation reference signal (DMRS), or tracking reference signal (TRS). In some aspects, the reference signal may include a Radar Reference Signal (RRS). The RRS may be used as a Quasi-Colocation (QCL) source for CSI-RS, TRS, DMRS, or a Physical Downlink Shared Channel (PDSCH) in Long-Term Evolution (LTE), Fifth Generation (5G) New Radio (NR), or Sixth Generation (6G) Radio Access Technologies (RATs). The information regarding the reference signal may include at least one of a descrambling ID, sequence, or resource allocation of the reference signal. In some aspects, the method may also include receiving, by the second base station the communication signals from the first base station in a line-of-sight path, and a portion of the communication signals reflected by the radar target.

According to certain aspects, a method may include, by a serving base station, receiving, from a radar server, information regarding a radar beam; determining, based on the information regarding the radar beam, a Quasi-Colocation (QCL) configuration for downlink data reception; sending the QCL configuration for downlink data reception to a User Equipment (UE); and sending downlink data to the UE, where the downlink data is received by the UE based on the QCL configuration.

In some aspects, the method may also include receiving, by the UE, the information regarding the radar beam; and determining, by the UE based on the information regarding the radar beam, a default receive beam for receiving the downlink data, where the default receive beam does not collide with the radar beam. In some aspects, the information regarding the radar beam may include at least one of a boresight direction, a beam width, or an uncertainty of the beam width of the radar beam.

According to certain aspects, a device may include a transceiver, a memory, and one or more processors communicatively coupled with the transceiver and the memory and configured to perform any of the above methods.

According to certain aspects, a device may include means for performing any of the above methods.

According to certain aspects, a non-transitory computer-readable medium may have instructions embedded thereon, the instructions, when executed by one or more processing units, causing the one or more processing units to perform any of the above methods.

This summary is neither intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim. The foregoing, together with other features and examples, will be described in more detail below in the following specification, claims, and accompanying drawings.

BRIEF DESCRIPTION OF THE DRAWINGS

Aspects of the present disclosure are illustrated by way of example. Non-limiting and non-exhaustive aspects are described with reference to the following figures.

Figure 1:
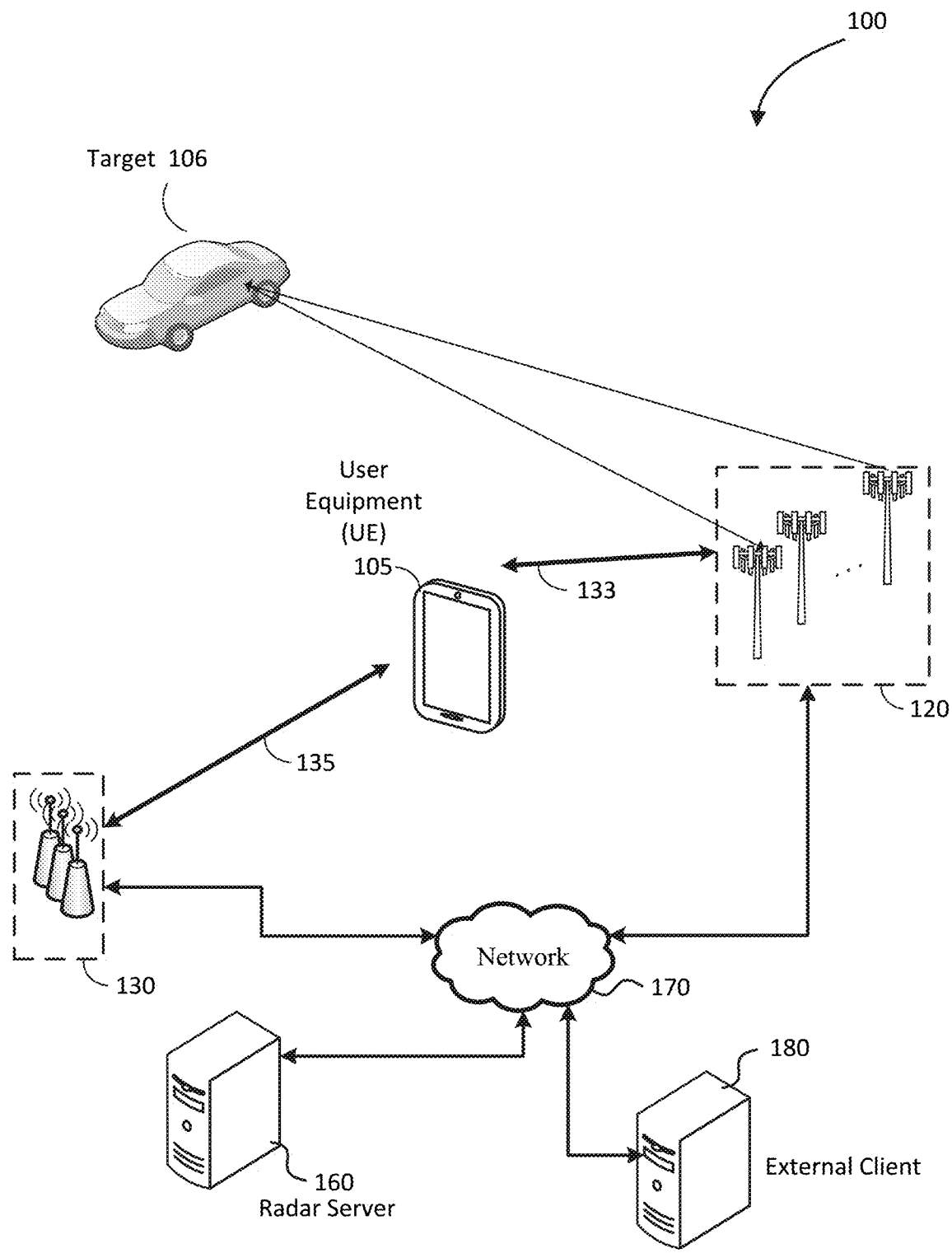
FIG. 1 is a simplified diagram of an example of a wireless system in which two or more base stations may be used to perform bistatic or multi-static radar operations according to certain embodiments.

In the figures, like reference numerals refer to like parts throughout various figures unless otherwise specified. In addition, multiple instances of a component may be distinguished by following the reference numeral by a second label (e.g., a letter or a number), or a dash and a second label. If only the first reference label is used in the specification, the description is applicable to any one of the similar components having the same first reference numeral irrespective of the second label.

DETAILED DESCRIPTION

Techniques disclosed herein relate generally to wireless systems, and more specifically, to wireless systems for joint wireless communication and RF sensing. Various inventive embodiments for reducing interferences between wireless communication signals and radar sensing signals are described herein, including devices, systems, components, apparatuses, methods, procedures, instructions, codes, computer-readable storage medium, and the like.

Wireless communication systems, such as cellular communication systems, may use Radio Access Technologies (RATs) with high bandwidth, such as Long-Term Evolution (LTE), Fifth Generation (5G) New Radio (NR), or Six Generation (6G). As such, new types of applications and services may be introduced into LTE, 5G NR, 6G, and future generations of wireless communication systems. For example, a cellular communication system may be used for both wireless communication and, for example, positioning and/or Radio Frequency (RF) sensing, such as radar sensing. To perform radar sensing, base stations or other Transmission Reception Points (TRPs) in the wireless (e.g., cellular) communication system may serve as radar transmitters and/or receivers for monostatic, bistatic, or multi-static radars, to sense the range, velocity, angle, and other properties of target objects using the cellular RF spectrum resource. The coexistence of data communication and radar sensing in the same allocated spectrum for a cellular communication system may cause significant interferences between the data communication signals and radar sensing signals. For example, at a first base station serving both as a serving base station for a User Equipment (UE) and as a radar receiver, the radar sensing signals transmitted by a second base station serving as a radar transmitter may interfere with the uplink data communication signals sent by the UE. As a result, the uplink data communication signals received by the first base station may have a low signal-to-interference-and-noise ratio (SINR) and thus may be difficult to decode. In another example, the radar sensing signals transmitted by one or more base stations serving as radar transmitters may interfere with the downlink data communication signals transmitted by a serving base station to a UE, and thus the downlink data communication signals received by the UE may have a low SINR and may be difficult to decode.

According to some embodiments, the interference of the radar signals with the uplink or downlink data communication signals may be reduced or eliminated by configuring the transmitters and/or receivers of the radar signals and the data communication signals. For example, to reduce or eliminate the interference of the radar signals with the uplink data communication signals, the radar transmitters may be configured to use resources not used by the uplink data communication, such as according to a muting pattern when multiple radar transmitters are used in the wireless system. The interference with the uplink data communication may additionally or alternatively be reduced or eliminated by tuning the serving base station (also serving as the radar receiver) to receive the uplink data communication signals from a beam that does not collide with the radar beam. The radar server may communicate the radar beam information to the serving base station. Based on the beam information regarding the radar beam, the serving base station may configure itself to receive the uplink data communication signals from a first beam and receive the radar signals from a second beam that does not collide with the first beam.

According to certain embodiments, to reduce or eliminate the interference of the radar signals with downlink data communication signals, the serving base station (also serving as the radar transmitter) may be configured to transmit the downlink data communication signals that include at least one reference signal, such as the channel state information reference signals (CSI-RS), positioning reference signals (PRS), demodulation reference signals (DMRS), or tracking reference signals (TRS) signal in LTE or 5G NR, where the reference signal in the downlink data communication signals may also be used for radar sensing. Thus, the downlink transmission may include a beam for both downlink data communication and radar sensing. The serving base station may communicate the radar receiver, for example, through the radar server, information regarding the downlink reference signal, such as the descrambling ID, sequence, and resource allocation of the downlink reference signal. The radar receiver may then configure itself to detect the downlink reference signal for radar sensing purposes. In some embodiments, the serving base station may transmit a jointly optimized beam for both data communications and radar sensing, where the jointly optimized beam may include a Radar Reference Signal (RRS) for radar sensing. Alternatively or additionally, the interference with the downlink data communication signals may be reduced or eliminated by adjusting the QCL source of the serving base station and tuning the UE to receive the downlink data communication signals from a beam that does not collide with the radar beam.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" (or UT), a "mobile device," a "mobile terminal," a "mobile station," or variations thereof. Generally, UEs can communicate with a core network via a RAN, and through the core network, the UEs can be connected with external networks (such as the Internet) and with other UEs. Other mechanisms of connecting to the core network and/or the Internet are also possible for the UEs, such as over wired access networks, wireless local area network (WLAN) networks (e.g., based on IEEE 802.11, etc.), and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), and the like. In NR systems, the term "cell" and next generation NodeB (gNB), new radio base station (NR BS), 5G NB, access point (AP), or transmission reception point (TRP) may be used interchangeably. A base station may be used primarily to support wireless access by UEs, including supporting data, voice, and/or signaling connections for the supported UEs. In some systems, a base station may provide purely edge node signaling functions, while in other systems, a based station may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein, the term traffic channel (TCH) can refer to either an uplink/reverse or downlink/forward traffic channel.

In some embodiments, the term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference RF signals (or simply "reference signals") the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

As used herein, the term "cell" may generically refer to a logical communication entity used for communication with a base station, and may be associated with an identifier for distinguishing neighboring cells (e.g., a Physical Cell Identifier (PCID), a Virtual Cell Identifier (VCID)) operating via the same or a different carrier. In some examples, a carrier may support multiple cells, and different cells may be configured according to different protocol types (e.g., Machine-Type Communication (MTC), Narrowband Internet-of-Things (NB-IoT), Enhanced Mobile Broadband (eMBB), or others) that may provide access for different types of devices. In some cases, the term "cell" may refer to a portion of a geographic coverage area (e.g., a sector) over which the logical entity operates.

As used herein, an "RF signal" comprises an electromagnetic wave of a given frequency range that transports information through the space between a transmitter (or transmitting device) and a receiver (or receiving device). As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

Additionally, references to "reference signals," "positioning reference signals," "reference signals for positioning," and the like may be used to refer to signals used for positioning of a user equipment (UE). As described in more detail herein, such signals may comprise any of a variety of signal types but may not necessarily be limited to a positioning reference signal (PRS) as defined in relevant wireless standards.

Several illustrative embodiments will now be described with respect to the accompanying drawings, which form a part hereof. The ensuing description provides embodiment(s) only and is not intended to limit the scope, applicability, or configuration of the disclosure. Rather, the ensuing description of the embodiment(s) will provide those skilled in the art with an enabling description for implementing one or more embodiments. It is understood that various changes may be made in the function and arrangement of elements without departing from the spirit and scope of this disclosure. In some instances, devices, systems, structures, assemblies, methods, and other components may be shown as components in block diagram form in order not to obscure the examples in unnecessary detail. In other instances, well-known devices, processes, systems, structures, and techniques may be shown without necessary detail in order to avoid obscuring the examples. The terms and expressions that have been employed in this disclosure are used as terms of description and not of limitation, and there is no intention in the use of such terms and expressions of excluding any equivalents of the features shown and described or portions thereof. The word "example" is used herein to mean "serving as an example, instance, or illustration." Any embodiment or design described herein as "example" is not necessarily to be construed as preferred or advantageous over other embodiments or designs.

FIG. 1 is a simplified illustration of a cellular communication system 100 in which two or more base stations 120 may be used to perform bistatic or multi-static radar operations to sense one or more targets 106, according to an embodiment of the disclosure. Cellular communication system 100 may comprise a UE 105, base stations 120, access points (APs) 130, a radar server 160, a network 170, an external client 180, and/or other components.

The radar server 160 may operate in a manner akin to a location server, in that the radar server may coordinate and manage radar operations within cellular communication system 100, much like a location server coordinates and manages positioning operations within a cellular communication system. More details of radar server 160 are described below, for example, with respect to FIG. 5-12.

It should be noted that FIG. 1 provides only a generalized illustration of various components, any or all of which may be utilized as appropriate, and each of which may be duplicated as necessary. Specifically, although only one UE 105 is illustrated, it will be understood that many UEs (e.g., hundreds, thousands, millions, etc.) may utilize the cellular communication system 100. Similarly, the cellular communication system 100 may include a larger or smaller number of base stations 120 and/or APs 130 than illustrated in FIG. 1. The illustrated connections that connect the various components in the cellular communication system 100 comprise data and signaling connections which may include additional (intermediary) components, direct or indirect physical and/or wireless connections, and/or additional networks. Furthermore, components may be rearranged, combined, separated, substituted, and/or omitted, depending on desired functionality. In some embodiments, for example, the external client 180 may be directly connected to radar server 160. A person of ordinary skill in the art will recognize many modifications to the components illustrated.

Depending on desired functionality, the network 170 may comprise any of a variety of wireless and/or wireline networks. The network 170 can, for example, comprise any combination of public and/or private networks, local and/or wide-area networks, and the like. Furthermore, the network 170 may utilize one or more wired and/or wireless communication technologies. In some embodiments, the network 170 may comprise a cellular or other mobile network, a wireless local area network (WLAN), a wireless wide-area network (WWAN), and/or the Internet, for example. Examples of network 170 include a Long-Term Evolution (LTE) wireless network, a Fifth Generation (5G) wireless network (also referred to as New Radio (NR) wireless network or 5G NR wireless network), a Wi-Fi WLAN, and the Internet. LTE, 5G and NR are wireless technologies defined, or being defined, by the 3rd Generation Partnership Project (3GPP). Network 170 may also include more than one network and/or more than one type of network.

The base stations 120 and access points (APs) 130 are communicatively coupled to the network 170. In some embodiments, the base station 120s may be owned, maintained, and/or operated by a cellular network provider, and may employ any of a variety of wireless technologies, as described herein below. Depending on the technology of the network 170, a base station 120 may comprise a node B, an Evolved Node B (eNodeB or eNB), a base transceiver station (BTS), a radio base station (RBS), an NR NodeB (gNB), a Next Generation eNB (ng-eNB), or the like. A base station 120 that is a gNB or ng-eNB may be part of a Next Generation Radio Access Network (NG-RAN) which may connect to a 5G Core Network (5GC) in the case that the network 170 is a 5G network. An AP 130 may comprise a Wi-Fi AP or a Bluetooth® AP, for example. Thus, UE 105 can send and receive information with network-connected devices, such as radar server 160, by accessing the network 170 via a base station 120 using a first communication link 133. Additionally or alternatively, because APs 130 also may be communicatively coupled with the network 170, UE 105 may communicate with Internet-connected devices, including radar server 160, using a second communication link 135.

Figure 2:
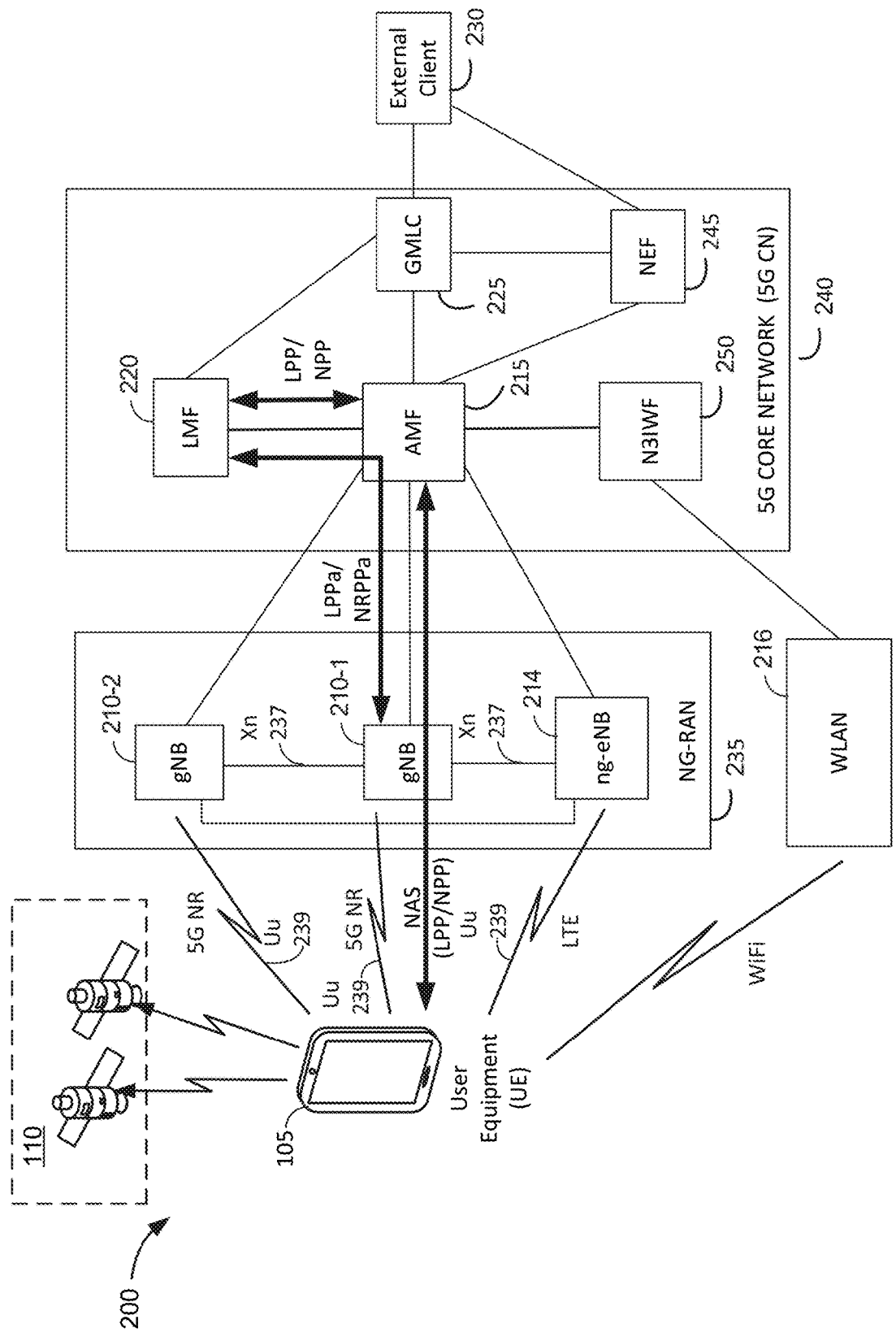
FIG. 2 is a simplified diagram of a Fifth Generation (5G) New Radio (NR) system that may be used to implement certain embodiments disclosed herein.

FIG. 2 shows a diagram of a 5G NR cellular communication system 200, which may be an embodiment of cellular communication system 100 implementing 5G NR. In addition to the radar-related functionality described below, the 5G NR cellular communication system 200 may, in some instances, operate as a positioning system configured to determine the location of a UE 105 by using access nodes 210, 214, 216 (which may correspond with base stations 120 and access points 130 of FIG. 1) and (optionally) an LMF 220 (which may correspond with radar server 160) to implement one or more positioning methods. In FIG. 2, the 5G NR cellular communication system 200 comprises a UE 105, and components of a 5G NR network comprising a Next Generation (NG) Radio Access Network (RAN) (NG-RAN) 235 and a 5G Core Network (5G CN) 240. A 5G network may also be referred to as an NR network; NG-RAN 235 may be referred to as a 5G RAN or as an NR RAN; and 5G CN 240 may be referred to as an NG Core network. The 5G NR cellular communication system 200 may optionally utilize information from GNSS satellites 110 of a GNSS system like Global Positioning System (GPS) or similar system (e.g. GLONASS, Galileo, Beidou, Indian Regional Navigational Satellite System (IRNSS)) for positioning purposes. Additional components of the 5G NR cellular communication system 200 are described below. The 5G NR cellular communication system 200 may include additional or alternative components.

It should be noted that FIG. 2 provides only a generalized illustration of various components, any or all of which may be utilized as appropriate, and each of which may be duplicated or omitted as necessary. Specifically, although only one UE 105 is illustrated, it will be understood that many UEs (e.g., hundreds, thousands, millions, etc.) may utilize the 5G NR cellular communication system 200. Similarly, the 5G NR cellular communication system 200 may include a larger (or smaller) number of GNSS satellites 110, gNBs 210, ng-eNBs 214, Wireless Local Area Networks (WLANs) 216, Access and Mobility Functions (AMF)s 215, external clients 230, and/or other components. The illustrated connections that connect the various components in the 5G NR cellular communication system 200 include data and signaling connections which may include additional (intermediary) components, direct or indirect physical and/or wireless connections, and/or additional networks. Furthermore, components may be rearranged, combined, separated, substituted, and/or omitted, depending on desired functionality.

The UE 105 may comprise and/or be referred to as a device, a mobile device, a wireless device, a mobile terminal, a terminal, a mobile station (MS), a Secure User Plane Location (SUPL)-Enabled Terminal (SET), or by some other name. Moreover, UE 105 may correspond to a cellphone, smartphone, laptop, tablet, personal data assistant (PDA), tracking device, navigation device, Internet of Things (IoT) device, or some other portable or moveable device. Typically, though not necessarily, the UE 105 may support wireless communication using one or more Radio Access Technologies (RATs) such as using Global System for Mobile Communications (GSM), Code Division Multiple Access (CDMA), Wideband CDMA (WCDMA), Long-Term Evolution (LTE), High Rate Packet Data (HRPD), IEEE 802.11 Wi-Fi®, Bluetooth, Worldwide Interoperability for Microwave Access (WiMAX™), 5G NR (e.g., using the NG-RAN 235 and 5G CN 240), etc. The UE 105 may also support wireless communication using a WLAN 216 which (like the one or more RATs, and as previously noted with respect to FIG. 1) may connect to other networks, such as the Internet. The use of one or more of these RATs may allow the UE 105 to communicate with an external client 230 (e.g., via elements of 5G CN 240 not shown in FIG. 2, or possibly via a Gateway Mobile Location Center (GMLC) 225) and/or allow the external client 230 to receive location information regarding the UE 105 (e.g., via the GMLC 225). The external client 230 of FIG. 2 may correspond to external client 180 of FIG. 1, as implemented in or communicatively coupled with a 5G NR network.

The UE 105 may include a single entity or may include multiple entities, such as in a personal area network where a user may employ audio, video and/or data I/O devices, and/or body sensors and a separate wireline or wireless modem. An estimate of a location of the UE 105 may be referred to as a location, location estimate, location fix, fix, position, position estimate, or position fix, and may be geodetic, thus providing location coordinates for the UE 105 (e.g., latitude and longitude), which may or may not include an altitude component (e.g., height above sea level, height above or depth below ground level, floor level or basement level). Alternatively, a location of the UE 105 may be expressed as a civic location (e.g., as a postal address or the designation of some point or small area in a building such as a particular room or floor). A location of the UE 105 may also be expressed as an area or volume (defined either geodetically or in civic form) within which the UE 105 is expected to be located with some probability or confidence level (e.g., 67%, 95%, etc.). A location of the UE 105 may further be a relative location comprising, for example, a distance and direction or relative X, Y (and Z) coordinates defined relative to some origin at a known location which may be defined geodetically, in civic terms, or by reference to a point, area, or volume indicated on a map, floor plan or building plan. In the description contained herein, the use of the term location may comprise any of these variants unless indicated otherwise. When computing the location of a UE, it is common to solve for local X, Y, and possibly Z coordinates and then, if needed, convert the local coordinates into absolute ones (e.g. for latitude, longitude and altitude above or below mean sea level).

Base stations in the NG-RAN 235 shown in FIG. 2 may correspond to base stations 120 in FIG. 1 and may include NR NodeB (gNB) 210-1 and 210-2 (collectively and generically referred to herein as gNBs 210) and/or an antenna of a gNB. Pairs of gNBs 210 in NG-RAN 235 may be connected to one another (e.g., directly as shown in FIG. 2 or indirectly via other gNBs 210). The communication interface between base stations (gNBs 210 and/or ng-eNB 214) may be referred to as an Xn interface 237. Access to the 5G network is provided to UE 105 via wireless communication between the UE 105 and one or more of the gNBs 210, which may provide wireless communications access to the 5G CN 240 on behalf of the UE 105 using 5G NR. The wireless interface between base stations (gNBs 210 and/or ng-eNB 214) and the UE 105 may be referred to as a Uu interface 239. 5G NR radio access may also be referred to as NR radio access or as 5G radio access. In FIG. 2, the serving gNB for UE 105 is assumed to be gNB 210-1, although other gNBs (e.g. gNB 210-2) may act as a serving gNB if UE 105 moves to another location or may act as a secondary gNB to provide additional throughput and bandwidth to UE 105.

Base stations in the NG-RAN 235 shown in FIG. 2 may also or instead include a next generation evolved Node B, also referred to as an ng-eNB, 214. Ng-eNB 214 may be connected to one or more gNBs 210 in NG-RAN 235—e.g. directly or indirectly via other gNBs 210 and/or other ng-eNBs. An ng-eNB 214 may provide LTE wireless access and/or evolved LTE (eLTE) wireless access to UE 105. Some gNBs 210 (e.g. gNB 210-2) and/or ng-eNB 214 in FIG. 2 may be configured to function as positioning-only beacons which may transmit signals (e.g., Positioning Reference Signal (PRS)) and/or may broadcast assistance data to assist positioning of UE 105 but may not receive signals from UE 105 or from other UEs. It is noted that while only one ng-eNB 214 is shown in FIG. 2, some embodiments may include multiple ng-eNBs 214. Base stations 210, 214 may communicate directly with one another via an Xn communication interface. Additionally or alternatively, base stations 210, 214 may communicate directly or indirectly with other components of the 5G NR cellular communication system 200, such as the LMF 220 and AMF 215.

5G NR cellular communication system 200 may also include one or more WLANs 216 which may connect to a Non-3GPP InterWorking Function (N3IWF) 250 in the 5G CN 240 (e.g., in the case of an untrusted WLAN 216). For example, the WLAN 216 may support IEEE 802.11 Wi-Fi access for UE 105 and may comprise one or more Wi-Fi APs (e.g., APs 130 of FIG. 1). Here, the N3IWF 250 may connect to other elements in the 5G CN 240 such as AMF 215. In some embodiments, WLAN 216 may support another RAT such as Bluetooth. The N3IWF 250 may provide support for secure access by UE 105 to other elements in 5G CN 240 and/or may support interworking of one or more protocols used by WLAN 216 and UE 105 to one or more protocols used by other elements of 5G CN 240 such as AMF 215. For example, N3IWF 250 may support IPSec tunnel establishment with UE 105, termination of IKEv2/IPSec protocols with UE 105, termination of N2 and N3 interfaces to 5G CN 240 for control plane and user plane, respectively, relaying of uplink and downlink control plane Non-Access Stratum (NAS) signaling between UE 105 and AMF 215 across an N1 interface. In some other embodiments, WLAN 216 may connect directly to elements in 5G CN 240 (e.g. AMF 215 as shown by the dashed line in FIG. 2) and not via N3 IWF 250. For example, direct connection of WLAN 216 to 5GCN 240 may occur if WLAN 216 is a trusted WLAN for 5GCN 240 and may be enabled using a Trusted WLAN Interworking Function (TWIF) (not shown in FIG. 2) which may be an element inside WLAN 216. It is noted that while only one WLAN 216 is shown in FIG. 2, some embodiments may include multiple WLANs 216.

Access nodes may comprise any of a variety of network entities enabling communication between the UE 105 and the AMF 215. This can include gNBs 210, ng-eNB 214, WLAN 216, and/or other types of cellular base stations. However, access nodes providing the functionality described herein may additionally or alternatively include entities enabling communications to any of a variety of RATs not illustrated in FIG. 2, which may include non-cellular technologies. Thus, the term "access node," as used in the embodiments described herein below, may include but is not necessarily limited to a gNB 210, ng-eNB 214 or WLAN 216.

In some embodiments, an access node, such as a gNB 210, ng-eNB 214, or WLAN 216 (alone or in combination with other components of the 5G NR cellular communication system 200 ), may be configured to, in response to receiving a request for location information from the LMF 220, obtain location measurements of uplink (UL) signals received from the UE 105) and/or obtain downlink (DL) location measurements from the UE 105 that were obtained by UE 105 for DL signals received by UE 105 from one or more access nodes. As noted, while FIG. 2 depicts access nodes 210, 214, and 216 configured to communicate according to 5G NR, LTE, and Wi-Fi communication protocols, respectively, access nodes configured to communicate according to other communication protocols may be used, such as, for example, a Node B using a WCDMA protocol for a Universal Mobile Telecommunications Service (UMTS) Terrestrial Radio Access Network (UTRAN), an eNB using an LTE protocol for an Evolved UTRAN (E-UTRAN), or a Bluetooth® beacon using a Bluetooth protocol for a WLAN. For example, in a 4G Evolved Packet System (EPS) providing LTE wireless access to UE 105, a RAN may comprise an E-UTRAN, which may comprise base stations comprising eNBs supporting LTE wireless access. A core network for EPS may comprise an Evolved Packet Core (EPC). An EPS may then comprise an E-UTRAN plus an EPC, where the E-UTRAN corresponds to NG-RAN 235 and the EPC corresponds to 5G CN 240 in FIG. 2. The methods and techniques described herein for UE 105 positioning using common or generic positioning procedures may be applicable to such other networks.

The gNBs 210 and ng-eNB 214 can communicate with an AMF 215, which, for positioning functionality, communicates with an LMF 220. The AMF 215 may support mobility of the UE 105, including cell change and handover of UE 105 from an access node 210, 214, or 216 of a first RAT to an access node 210, 214, or 216 of a second RAT. The AMF 215 may also participate in supporting a signaling connection to the UE 105 and possibly data and voice bearers for the UE 105. The LMF 220 may support positioning of the UE 105 when UE 105 accesses the NG-RAN 235 or WLAN 216 and may support position procedures and methods, including UE assisted/UE based and/or network based procedures/methods, such as Assisted GNSS (A-GNSS), Observed Time Difference Of Arrival (OTDOA), Real Time Kinematics (RTK), Precise Point Positioning (PPP), Differential GNSS (DGNSS), ECID, angle of arrival (AOA), angle of departure (AOD), WLAN positioning, and/or other positioning procedures and methods. The LMF 220 may also process location services requests for the UE 105, e.g., received from the AMF 215 or from the GMLC 225. The LMF 220 may be connected to AMF 215 and/or to GMLC 225. The LMF 220 may be referred to by other names such as a Location Manager (LM), Location Function (LF), commercial LMF (CLMF), or value added LMF (VLMF). In some embodiments, a node/system that implements the LMF 220 may additionally or alternatively implement other types of location-support modules, such as an Evolved Serving Mobile Location Center (E-SMLC) or Service Location Protocol (SLP). It is noted that in some embodiments, at least part of the positioning functionality (including determination of a UE's location) may be performed at the UE 105 (e.g., by processing downlink PRS (DL-PRS) signals transmitted by wireless nodes such as gNBs 210, ng-eNB 214 and/or WLAN 216, and/or using assistance data provided to the UE 105, e.g., by LMF 220).

The Gateway Mobile Location Center (GMLC) 225 may support a location request for the UE 105 received from an external client 230 and may forward such a location request to the AMF 215 for forwarding by the AMF 215 to the LMF 220, or may forward the location request directly to the LMF 220. A location response from the LMF 220 (e.g., containing a location estimate for the UE 105) may be similarly returned to the GMLC 225 either directly or via the AMF 215, and the GMLC 225 may then return the location response (e.g., containing the location estimate) to the external client 230. The GMLC 225 is shown connected to both the AMF 215 and LMF 220 in FIG. 2 though only one of these connections may be supported by 5G CN 240 in some implementations.

A Network Exposure Function (NEF) 245 may be included in 5GCN 240. The NEF 245 may support secure exposure of capabilities and events concerning 5GCN 240 and UE 105 to the external client 230, which may then be referred to as an Access Function (AF) and may enable secure provision of information from external client 230 to 5GCN 240. NEF 245 may be connected to AMF 215 and/or to GMLC 225 for the purposes of obtaining a location (e.g. a civic location) of UE 105 and providing the location to external client 230.

As further illustrated in FIG. 2, the LMF 220 may communicate with the gNBs 210 and/or with the ng-eNB 214 using the LPPa protocol (which also may be referred to as NRPPa or NPPa) as defined in 3GPP Technical Specification (TS) 38.445. LPPa protocol in NR may be the same as, similar to, or an extension of the LPPa protocol in LTE (related to LTE Positioning Protocol (LPP)), with LPPa messages being transferred between a gNB 210 and the LMF 220, and/or between an ng-eNB 214 and the LMF 220, via the AMF 215. As further illustrated in FIG. 2, LMF 220 and UE 105 may communicate using an LPP protocol as defined in 3GPP TS 37.355. Here, LPP messages may be transferred between the UE 105 and the LMF 220 via the AMF 215 and a serving gNB 210-1 or serving ng-eNB 214 for UE 105. For example, LPP and/or LPP messages may be transferred between the LMF 220 and the AMF 215 using messages for service-based operations (e.g., based on the Hypertext Transfer Protocol (HTTP)) and may be transferred between the AMF 215 and the UE 105 using a 5G NAS protocol. The LPP and/or LPP protocol may be used to support positioning of UE 105 using UE assisted and/or UE based position methods such as A-GNSS, RTK, OTDOA and/or Enhanced Cell ID (ECID). The LPPa protocol may be used to support positioning of UE 105 using network based position methods such as ECID, AoA, uplink TDOA (UL-TDOA) and/or may be used by LMF 220 to obtain location related information from gNBs 210 and/or ng-eNB 214, such as parameters defining DL-PRS transmission from gNBs 210 and/or ng-eNB 214.

In the case of UE 105 access to WLAN 216, LMF 220 may use LPPa and/or LPP to obtain a location of UE 105 in a similar manner to that just described for UE 105 access to a gNB 210 or ng-eNB 214. Thus, LPPa messages may be transferred between a WLAN 216 and the LMF 220, via the AMF 215 and N3IWF 250 to support network-based positioning of UE 105 and/or transfer of other location information from WLAN 216 to LMF 220. Alternatively, LPPa messages may be transferred between N3IWF 250 and the LMF 220, via the AMF 215, to support network-based positioning of UE 105 based on location related information and/or location measurements known to or accessible to N3IWF 250 and transferred from N3IWF 250 to LMF 220 using LPPa. Similarly, LPP and/or LPP messages may be transferred between the UE 105 and the LMF 220 via the AMF 215, N3IWF 250, and serving WLAN 216 for UE 105 to support UE assisted or UE based positioning of UE 105 by LMF 220.

Positioning methods that a 5G NR cellular communication system 200 may support can be categorized as being "UE assisted" or "UE based." This may depend on where the request for determining the position of the UE 105 originated. If, for example, the request originated at the UE (e.g., from an application, or "app," executed by the UE), the positioning method may be categorized as being UE based. If, on the other hand, the request originates from an external client or AF 230, LMF 220, or other device or service within the 5G network, the positioning method may be categorized as being UE assisted (or "network-based"). Similar to the radar communication described below, positioning performed using a 5G NR cellular communication system 200 may involve transmission of one or more types of reference signals but for position estimation rather than radar sensing.

With a UE-assisted position method, UE 105 may obtain location measurements and send the measurements to a location server (e.g., LMF 220) for computation of a location estimate for UE 105. For RAT-dependent position methods location measurements may include one or more of a Received Signal Strength Indicator (RSSI), Round Trip signal propagation Time (RTT), Reference Signal Received Power (RSRP), Reference Signal Received Quality (RSRQ), Reference Signal Time Difference (RSTD), Time of Arrival (TOA), AoA, Receive Time-Transmission Time Difference (Rx-Tx), Differential AoA (DAoA), AoD, or Timing Advance (TA) for gNBs 210, ng-eNB 214, and/or one or more access points for WLAN 216. Additionally or alternatively, similar measurements may be made of sidelink signals transmitted by other UEs, which may serve as anchor points for positioning of the UE 105 if the positions of the other UEs are known. The location measurements may also or instead include measurements for RAT-independent positioning methods such as GNSS (e.g., GNSS pseudorange, GNSS code phase, and/or GNSS carrier phase for GNSS satellites 110), WLAN, etc.

With a UE-based position method, UE 105 may obtain location measurements (e.g., which may be the same as or similar to location measurements for a UE assisted position method) and may further compute a location of UE 105 (e.g., with the help of assistance data received from a location server such as LMF 220, an SLP, or broadcast by gNBs 210, ng-eNB 214, or WLAN 216).

With a network based position method, one or more base stations (e.g., gNBs 210 and/or ng-eNB 214), one or more APs (e.g., in WLAN 216), or N3IWF 250 may obtain location measurements (e.g., measurements of RSSI, RTT, RSRP, RSRQ, AoA, or TOA) for signals transmitted by UE 105, and/or may receive measurements obtained by UE 105 or by an AP in WLAN 216 in the case of N3IWF 250, and may send the measurements to a location server (e.g., LMF 220) for computation of a location estimate for UE 105.

Positioning of the UE 105 also may be categorized as UL, DL, or DL-UL based, depending on the types of signals used for positioning. If, for example, positioning is based solely on signals received at the UE 105 (e.g., from a base station or other UE), the positioning may be categorized as DL based. On the other hand, if positioning is based solely on signals transmitted by the UE 105 (which may be received by a base station or other UE, for example), the positioning may be categorized as UL based. Positioning that is DL-UL based includes positioning, such as RTT-based positioning, that is based on signals that are both transmitted and received by the UE 105. Sidelink (SL)-assisted positioning comprises signals communicated between the UE 105 and one or more other UEs. According to some embodiments, UL, DL, or DL-UL positioning as described herein may be capable of using SL signaling as a complement or replacement of SL, DL, or DL-UL signaling.

Depending on the type of positioning (e.g., UL, DL, or DL-UL based) the types of reference signals used can vary. For DL-based positioning, for example, these signals may comprise PRS (e.g., DL-PRS transmitted by base stations or SL-PRS transmitted by other UEs), which can be used for TDOA, AoD, and RTT measurements. Other reference signals that can be used for positioning (UL, DL, or DL-UL) may include Sounding Reference Signal (SRS), Channel State Information Reference Signal (CSI-RS), synchronization signals (e.g., synchronization signal block (SSB) Synchronizations Signal (SS)), Physical Uplink Control Channel (PUCCH), Physical Uplink Shared Channel (PUSCH), Physical Sidelink Shared Channel (PSSCH), Demodulation Reference Signal (DMRS), etc. Moreover, reference signals may be transmitted in a Tx beam and/or received in an Rx beam (e.g., using beamforming techniques), which may impact angular measurements, such as AoD and/or AoA.

Figure 3:
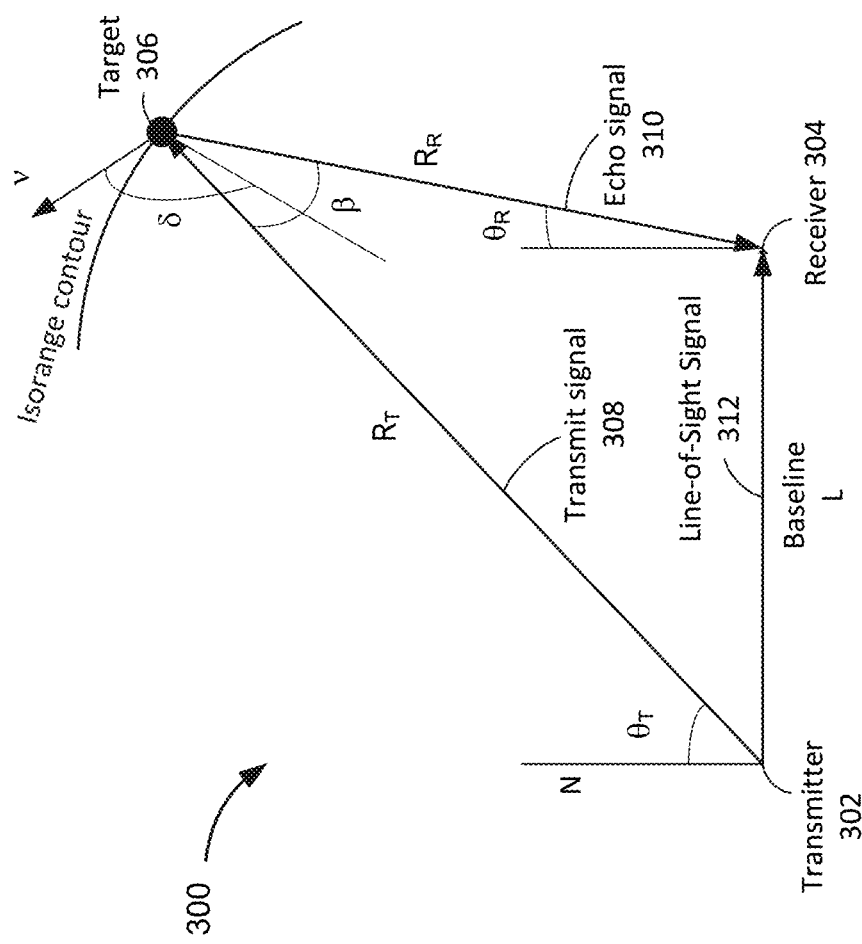
FIG. 3 is a simplified diagram illustrating the operation of a bistatic radar system.

FIG. 3 is a simplified diagram illustrating the operation of a bistatic radar system 300. A transmitter 302 and a receiver 304 are used to send and receive radar signals respectively for sensing a target 306. While a bistatic radar example is shown, the same principals of operation can be applied to a multi-static radar, which utilizes more than two transmitter(s) and/or receiver(s). For example, a multi-static radar may utilize one transmitter and two receivers. In another example, a multi-static radar may utilize two transmitters and one receiver. Larger numbers of transmitters and/or receivers may also be used in some embodiments.

In bistatic radar system 300, transmitter 302 may send a transmit signal 308 that traverses a distance $R_T$ to reach target 306. Transmit signal 308 may reflect from target 306 and becomes an echo signal 310 that traverses a distance $R_R$ to reach receiver 304. A primary function served by bistatic radar system 300 is sensing the range, or distance $R_R$, from target 306 to receiver 304. The system determines the range $R_R$ primary by sensing the amount of time taken for the transmit signal 308 and echo signal 310 to traverse the total distance $R_{sum}$, which is the sum of $R_T$ and $R_R$:

$$R_{sum} = R_T + R_R \qquad (\text{Eq. 1})$$

The total distance $R_{sum}$ defines an ellipsoid surface (also known as the iso-range contour) with foci at the locations of transmitter 302 and receiver 304, respectively. The ellipsoid surface represents all the possible locations of target 306, given the total distance $R_{sum}$. Bistatic radar system 300 is capable of measuring the distance $R_{sum}$. For example, if transmitter 302 and receiver 304 are synchronized (which is not required as described below), the time duration $T_{sum}$ between the moment when transmitter 302 sent transmit signal 308 and the moment when receiver 304 received echo signal 310 may be determined. Multiplying the time duration $T_{sum}$ by the speed of the signal in free space, e.g., approximately $c = 3 \times 10^8$ meters/second, would yield $R_{sum}$. Thus, the ellipsoid surface of all possible locations of target 306 can be found by measuring the "flight time" $T_{sum}$ of the bistatic radar signal.

According to some embodiments, the distance $R_{sum}$ can be measured without tight time synchronization between transmitter 302 and receiver 304. In one embodiment, a line-of-sight (LOS) signal 312 can be sent from transmitter 302 to receiver 304 at the same time when transmitter 302 sends transmit signal 308 toward target 306. In one implementation, transmit signal 308 may correspond to a main lobe of a transmit antenna beam pattern emitted from transmitter 302, while LOS signal 312 may correspond to a side lobe of the same transmit antenna beam pattern emitted from transmitter 302. In other implementations, transmit signal 308 and LOS signal 312 may be arranged in other manners.

Receiver 304 may receive both echo signal 310 and LOS signal 312, and can then utilize the timing of the reception of these two signals to measure the total distance $R_{sum}$, using the expression:

$$R_{sum} = (T_{Rx\_echo} - T_{RxLOS}) \times c + L \qquad (\text{Eq. 2})$$

where $T_{Rx\_echo}$ is the time of reception of echo signal 310, $T_{RxLOS}$ is the time of reception of LOS signal 312, c is the speed of the signal in free space, and L is the distance between transmitter 302 and receiver 304. Once $R_{sum}$ is determined, it can be used to calculate the target range $R_R$ between target 306 and receiver 304 using the following expression:

$$R_R = \frac{R_{sum}^2 - L^2}{2(R_{sum} + L \times \sin\theta_R)} \qquad (\text{Eq. 3})$$

Bistatic radar system 300 can also be used to determine the angle of arrival (AoA) $\theta_R$ at which echo signal 310 is received by receiver 304. This can be done in various ways. One way is to estimate $\theta_R$ by using an antenna array at receiver 304. An antenna array, which comprises multiple antenna elements, can be operated as a programmable directional antenna capable of sensing the angle at which a signal is received. Thus, receiver 304 may employ an antenna array to sense the angle of arrival of echo signal 310. Another way to estimate $\theta_R$ involves multilateration. Multilateration refers to the determination of the intersection of two or more curves or surfaces that represent possible locations of a target. For example, bistatic radar system 300 shown in FIG. 3 can define a first ellipsoid surface representing possible locations of target 306, as described previously. A second bistatic radar system with a differently located transmitter and/or receiver can define a second, different ellipsoid surface that also represents the possible locations of target 306. The intersections of the first ellipsoid surface and the second ellipsoid surface may correspond to the possible locations of target 306. In a three-dimensional space, four such ellipsoid surfaces may generally be needed to reduce the possible location to a single point, thus identifying the location of target 306. In a two-dimensional space (e.g., assuming all transmitters, receivers, and the targets are on the ground), three such ellipsoid surfaces (for two-dimensional space, the ellipsoid surfaces reduce to elliptical curves) would generally be needed to reduce the possible locations to a single point, thus identifying the location of target 306. Multilateration can also be achieved in a similar manner using multi-static radar system instead of multiple bistatic radar systems.

Furthermore, bistatic radar system 300 can also be used to determine the Doppler frequency associated with target 306. The Doppler frequency denotes the relative velocity of target 306 from the perspective of receiver 304 (the velocity at which target 306 is approaching or moving away from receiver 304 ). For a stationary transmitter 302 and a stationary receiver 304, the Doppler frequency of target 306 can be calculated as:

$$f_D = \frac{2v}{c} \times \cos\delta \times \cos(\beta/2) \qquad \text{(Eq. 4)}$$

Here, $f_D$ is the Doppler frequency, v is the velocity of target 306 relative to a fixed frame of reference defined by stationary transmitter 302 and receiver 304. β is the angle formed between transmit signal 308 and echo signal 310 at the target 306. δ is the angle between the velocity vector v and the center ray (half angle) defined within angle β.

In FIG. 3, a fixed frame of reference is defined with respect to stationary transmitter 302 and stationary receiver 304. Specifically, a baseline of length L can be drawn between transmitter 302 and receiver 304. The baseline can be extended beyond transmitter 302 and receiver 304. One or more normal lines can be drawn as being perpendicular to the baseline. A transmit angle $\theta_T$ can be defined relative to a normal line drawn from the location of transmitter 302. A receive angle $\theta_R$, referred to above as the angle of arrival, can be defined relative to a normal line drawn from the location of receiver 304.

As mentioned previously, bistatic radar system 300 can be operated to sense a target in a two-dimensional space or a three-dimensional space. An additional degree of freedom is introduced in the case of three-dimensional space. However, the same basic principles apply, and analogous calculations may be performed.

Figure 4:
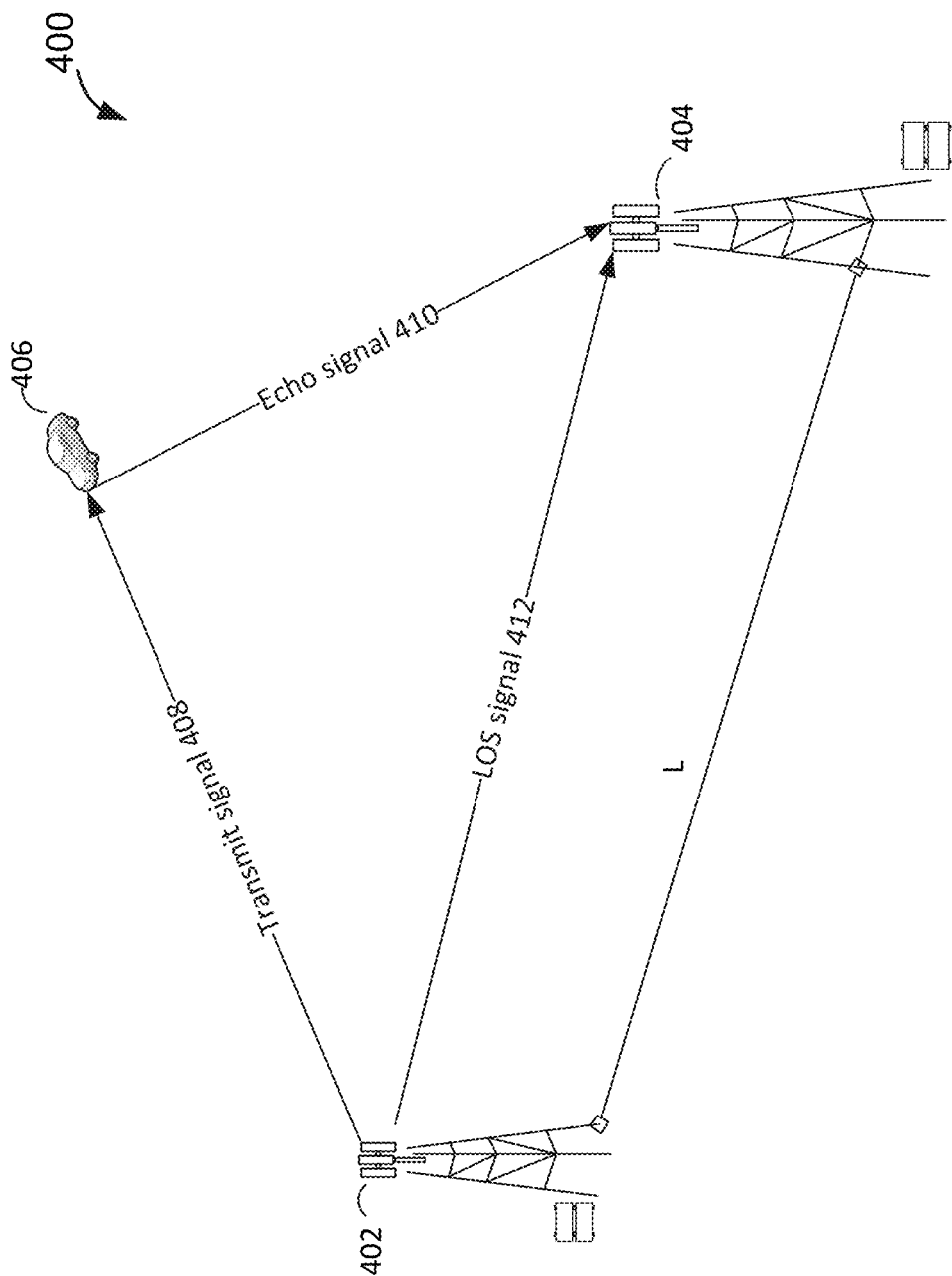
FIG. 4 illustrates an example of a bistatic radar system in a wireless communication system according to certain embodiments.

FIG. 4 illustrates an example of an implementation of bistatic radar system 300 in a wireless communication system 400 according to certain embodiments. Wireless communication system 400 may include numerous TRPs, which perform signal transmission and/or reception with other devices. Examples of TRPs within wireless communication system 400 include base stations 402 and 404, which may serve to provide wireless communications for UE, such as vehicles, wireless phones, wearable device, personal access points, and a plethora of other types of user devices in the vicinity that are capable of wireless data communications. For instance, base stations 402 and 404 may be configured to support data communications with a UE device, by transmitting data symbols to or receiving data symbols from the UE device. Resources within wireless communication system 400, such as base stations 402 and 404, may thus be utilized to serve "double duty" to support not only wireless communication operations but also bistatic and/or multi-static radar operations. Wireless communication system 400 may be a cellular communication system.

For example, base stations 402 and base station 404 may serve as the transmitter 302 and receiver 304, respectively, of bistatic radar system 300 shown in FIG. 3. Base station 402 may transmit a transmit signal 408, which may reflect from target 406 and becomes an echo signal 410 received by base stations 404. Base station 404 may also receive an LOS signal 412 from base station 402. By receiving both LOS signal 412 and echo signal 410, base station 404 can measure the value associated with the time difference between reception times $T_{Rx\_echo}$ and $T_{RxLOS}$ associated with the reception of LOS signal 412 and echo signal 410, respectively. For example, base station 404 may cross-correlate the received LOS signal 412 with the received echo signal 410, such as by mixing the two signals in analog or digital form, to yield a value representative of the time difference ($T_{Rx\_echo} - T_{RxLOS}$). The time difference can be used to find the total distance $R_{sum}$. The total distance $R_{sum}$ can then be used to define an ellipsoid surface, which along with other information may be used to determine one or more attributes of the target 406, including the target range $R_R$, angle of arrival (AoA) $\theta_R$, and/or Doppler frequency associated with the target 406, using one or more techniques discussed above with respect to FIG. 3.

In some embodiments, target 406 may be a UE that is supported by wireless communication system 400. In some instances, target 406 may be a UE that is configured to transmit and receive wireless signals carrying voice, text, and/or wireless data using the base stations of wireless communication system 400. In other instances, target 406 may be a remote object that is within the bistatic radar range of base station 402 and base station 404 but may have no communication with wireless communication system 400.

In the bistatic example shown in FIG. 4, the transmitter is the TX base station 402, and the receiver is the RX base station 404. More generally, TX base station 402 may be referred to as a TX TRP, and RX base station 404 may be referred to as a RX TRP. Here "TX" and "RX" merely refer to the fact that base station 402 is used to transmit radar transmit signal 408, and base station 404 is used to receive radar echo signal 410. The terms "TX" and "RX" in this context do not limit the operation of the base stations 402 and 404 to serve other functions, for example, to serve as receiver and/or transmitter in other bistatic or multi-static radar operations or as base stations transmitting and receiving data communications in the normal operation of wireless communication system 400. While FIG. 4 illustrates a bistatic radar system, a multi-static radar system may also be implemented within a wireless communication system in a similar manner. Also, while FIG. 4 illustrates an example in a two-dimensional space, the same operations can be extended to the three-dimensional space.

Implementing a bistatic or multi-static radar system within a wireless communication system according to certain embodiments disclosed herein may yield numerous benefits. One particular benefit is the flexible utilization of bandwidth allocated for wireless communications. As described above, an example of wireless communication system 400 is a cellular communication system. For example, according to one embodiment, wireless communication system 400 may conform to the above-mentioned Fifth Generation (5G) standard. Ever increasing bandwidth allocated to present and future wireless communication systems, including 5G and 5G beyond, may be leveraged for the transmission of bistatic and multi-static radar signals. Thus, radio frequency (RF) sensing (e.g. radar) may be enabled by utilizing available wireless RF spectrum resource. For example, one or more of transmit signal 408, echo signal 410, and/or LOS signal 412 may occupy bandwidth within a portion of radio frequency (RF) spectrum allocated to the wireless communication system 400 for data communications. Another example of wireless communication system 400 is a Long-Term Evolution (LTE) wireless communication system. Other examples of wireless communication system 400 include a wireless local area network (WLAN), a wireless wide area network (WWAN), a small cell-based wireless communication system, a millimeter wave-based (mmwave-based) communication system, and other types of communication systems that include TRPs.

Also, the inherent benefits of bistatic and multi-static radar systems can be realized by an existing, widespread network of well-positioned transmitters and receivers, in the form of wireless base stations. Compared with a monostatic radar system, a bistatic or multi-static radar system mitigates against self-interference by having physically separated transmitter equipment and receiver equipment. Wireless base stations, such as base stations 402 and 404 shown in FIG. 4, already exist and cover vast geographic areas where users, vehicles, and other objects of interest are likely to appear. Such wireless base stations are well-dispersed, and thus provide opportunities for the selection of appropriately located base stations to serve as transmitters and receivers for bistatic and multi-static radar operations.

A significant challenge posed in the development of a bistatic or multi-static radar system is the coordination between transmitter(s) and the receiver(s). According to certain embodiments, a "radar server" may be implemented to support the operations of one or more bistatic and/or multi-static radar systems implemented within a wireless communication system. Here, a "radar server" is may be realized as a combination of hardware and/or software resources that reside within the wireless communications network. Thus, the radar server may be defined as a functional block, facility, or node that serves to, for example, configure and/or control parameters relied upon by TX and RX base stations involved in bistatic and/or multi-static radar operations.

Figure 5:
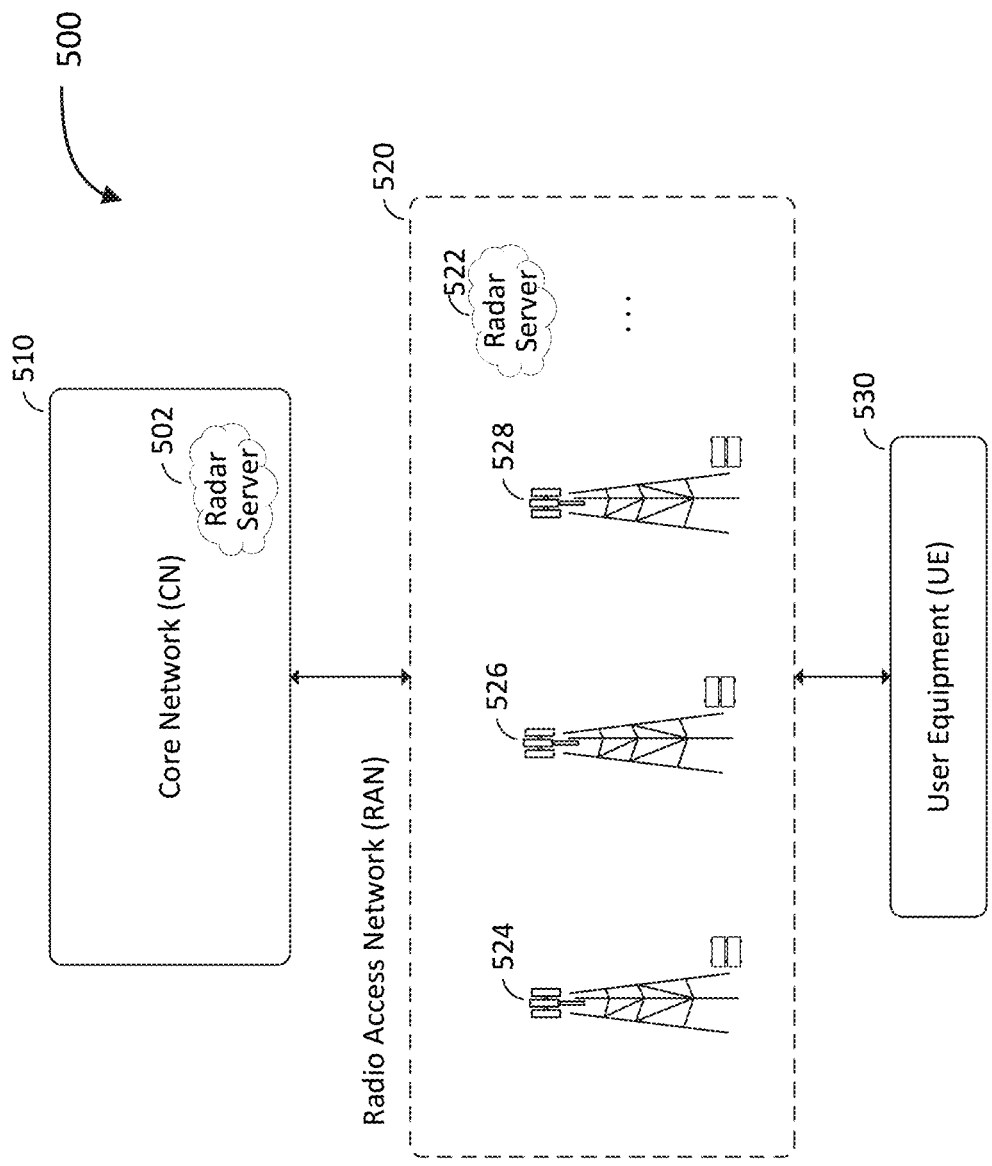
FIG. 5 includes a block diagram of an example of a wireless communication system that includes a radar server according to certain embodiments.

FIG. 5 is a block diagram of a wireless communication system 500 that may include a radar server according to certain embodiments. Wireless communication system 500 comprises a core node (CN) 510, a radio access network (RAN) 520, and one or more UEs 530. In one embodiment, a radar server 502 may be implemented within CN 510. CN 510 may provide wireless communication system 500 with connectivity to the Internet and to application services. CN 510 may be implemented with various computing resources, which may include memory and one or more processors executing an operating system and executing applications comprising programmed instructions. In a specific embodiment, radar server 502 may be implemented within the computing resources of CN 510.

In another embodiment, a radar server 522 may be implemented within RAN 520. For example, RAN 520 may comprise base stations 524, 526, and 528. Each of base stations 524, 526, and 528 may comprise transmitter and receiver hardware such as antennas, antenna elements, cabling, a physical tower structure, modems, encoder/decoders, networking equipment, computing resources, and other components. The computing resources associated with each base station may include memory and one or more processors executing an operating system and executing applications comprising programmed instructions. In a specific embodiment, radar server 522 may be implemented within the computing resources of one or more of base stations 524, 526, and 528.

Radar server 502 or 522 may be implemented in RAN 520, CN 510, or elsewhere in a wireless communication system 500, such as a cellular communication system. In some embodiments, radar server 502 or 522 may not be dedicated server. For example, radar server 502 or 522 can be a generic server, a positioning server, an assisted driver server, a tracker server, or another server providing a different functionality. Furthermore, radar server 502 or 522 can be, but does not have to be, operated or owned by the network operator. Radar server 502 or 522 can be a network independent server (e.g. third party server).

Wherever it is implemented, radar server 502 or 522 may be communicatively coupled, via one or more interfaces, to the transmission reception points (TRPs), e.g., base stations 524, 526, and 528, within RAN 520. The one or more interfaces may comprise point-to-point interfaces. An example of such a point-to-point interface is an interface implementing an Internet Protocol (IP) communication protocol over a wired network (e.g., "backhaul" network).

In certain embodiments, wireless communication system 500 may conform to 5G standards. In such cases, CN 510 may be a 5G core node (5G CN), RAN 520 may be a 5GPP Next Generation Radio Access Network (NG RAN), and each of the base stations 524, 526, and 528 may be a gNodeB or gNB. Thus, CN 510 may correspond to 5G CN 240 in FIG. 2 and RAN 520 may correspond to NG-RAN 235.

The coexistence of data communication and radar sensing in the allocated frequency band in a cellular communication system, such as wireless communication system 400 and wireless communication system 500, may cause significant interference between the data communication signals and radar sensing signals. For example, at a first base station serving as both a serving base station for a UE and a radar receiver, the radar sensing signals transmitted by a second base station serving as a radar transmitter may interfere with the uplink data communication signals sent by the UE, such that the uplink data communication signals received by the first base station may have a low signal-to-interference-and-noise ratio (SINR) and thus may be difficult to decode. The radar sensing signals transmitted by one or more base stations serving as radar transmitters may also interfere with the downlink data communication signals transmitted by a serving base station to a UE, and thus the downlink data communication signals received by the UE may have a low SINR and may be difficult to decode.

Figure 6:
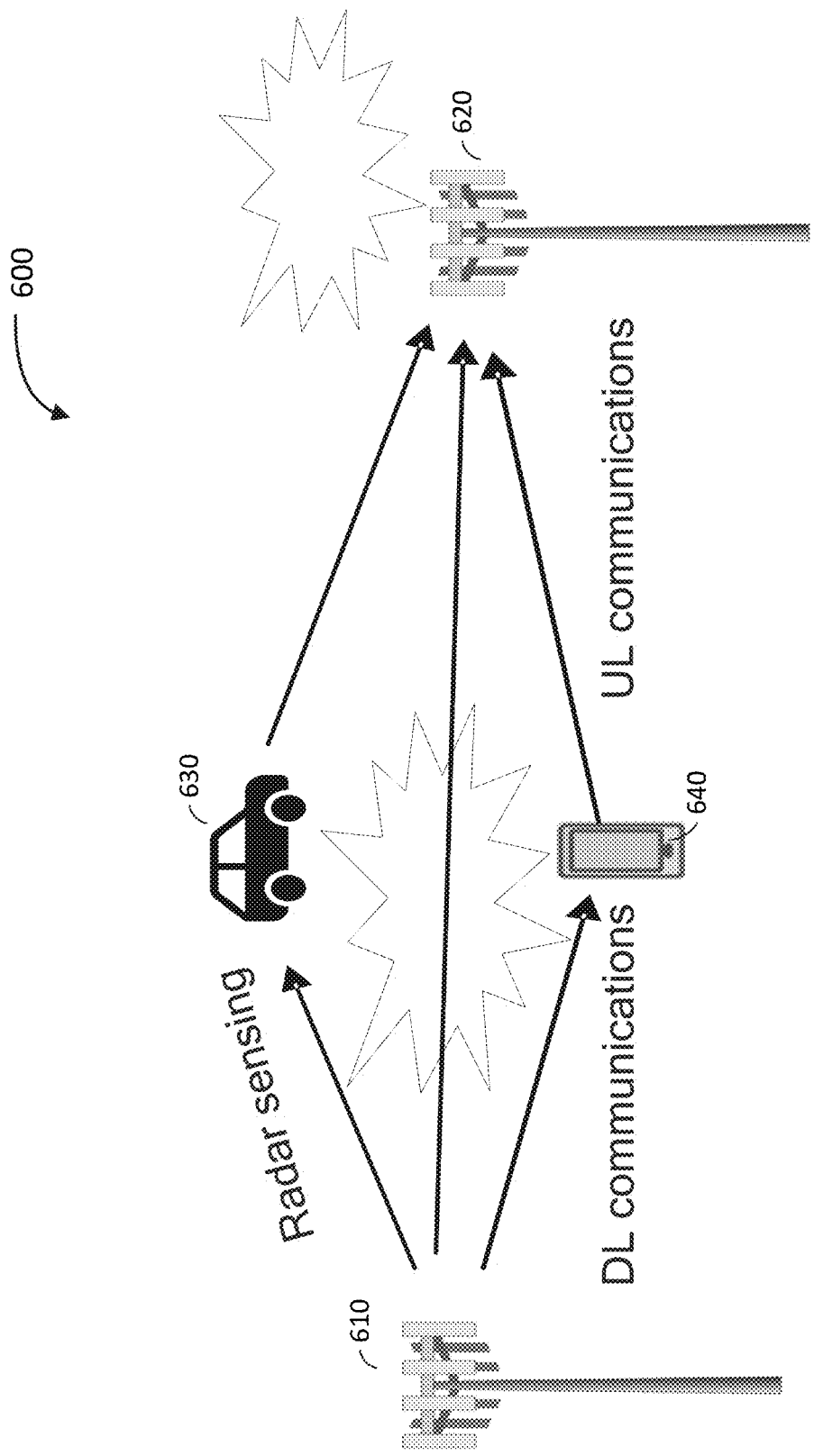
FIG. 6 illustrates examples of interferences between radar signals and data communication signals in a wireless system.

FIG. 6 illustrates examples of interferences between radar signals and data communication signals in a wireless system 600. Wireless system 600 may be any wireless communication system described above that includes multiple TRPs. In the illustrated example, wireless system 600 may include two or more base stations 610, 620, and the like. Base stations 610 and 620 may be used for uplink and downlink data communication with one or more UEs 640 using various RATs, such as LTE, 5G NR, 6G, and future generation RATs. Based on the location of UE 640 at a given time, base station 610 or 620 may be the serving base station of the serving cell for uplink and downlink data communication with UE 640. For example, the serving base station (e.g., base station 610 or 620 ) may send downlink data communication signals to UE 640, and UE 640 may send uplink data communication signals to the serving base station (e.g., base station 610 or 620 ).

In addition, base stations 610 and 620 and other base stations in wireless system 600 may form a bistatic or multi-static radar as described above with respect to FIG. 3-5. In the example shown in FIG. 6, base station 610 may serve as a radar transmitter (a TX base station) and base station 620 may serve as a radar receiver (an RX base station) of a bistatic radar for sensing one or more target objects, such as an object 630. As described above, base station 610 may send radar sensing signals to object 630, which may deflect the radar sensing signals to base station 620. Base station 610 may also send LOS signals to base station 620. The LOS signals and the radar sensing signals may be in a same beam (e.g., different lobes of a same beam) or in different beams.

The UL/DL data communication signals and radar sensing signals may be in a same allocated frequency band in a cellular communication system, and may use the same resource in the time, frequency, and space domain. Therefore, there may be significant interference between the data communication signals and radar sensing signals. For example, at base station 620, which serves as both a serving base station for UE 640 and a radar receiver for the bistatic receiver, the radar sensing signals transmitted by base station 610 that serves as a radar transmitter may interfere with the uplink data communication signals sent by UE 640 to base station 620, such that the uplink data communication signals received by base station 620 may have a low SINR and thus may be difficult to decode. In another example, the radar sensing signals transmitted by base station 610 serving as the radar transmitter may interfere with the downlink data communication signals transmitted by the serving base station 610 or 620 to UE 640, and thus the downlink data communication signals received by UE 640 may have a low SINR and may be difficult to decode.

According to some embodiments, the interference of the radar signals with the uplink or downlink data communication signals may be reduced or eliminated by configuring the transmitters and/or receivers of the radar signals and the data communication signals. For example, to reduce or eliminate the interference of the radar signals with the uplink data communication signals, the radar transmitters may be configured to use resources not used by the uplink data communication, such as according to a muting pattern when multiple radar transmitters are in the wireless system. The interference with the uplink data communication may additionally or alternatively be reduced or eliminated by tuning the serving base station (also serving as the radar receiver) to receive the uplink data communication signals from a beam that does not collide with the radar beam.

Figure 7:
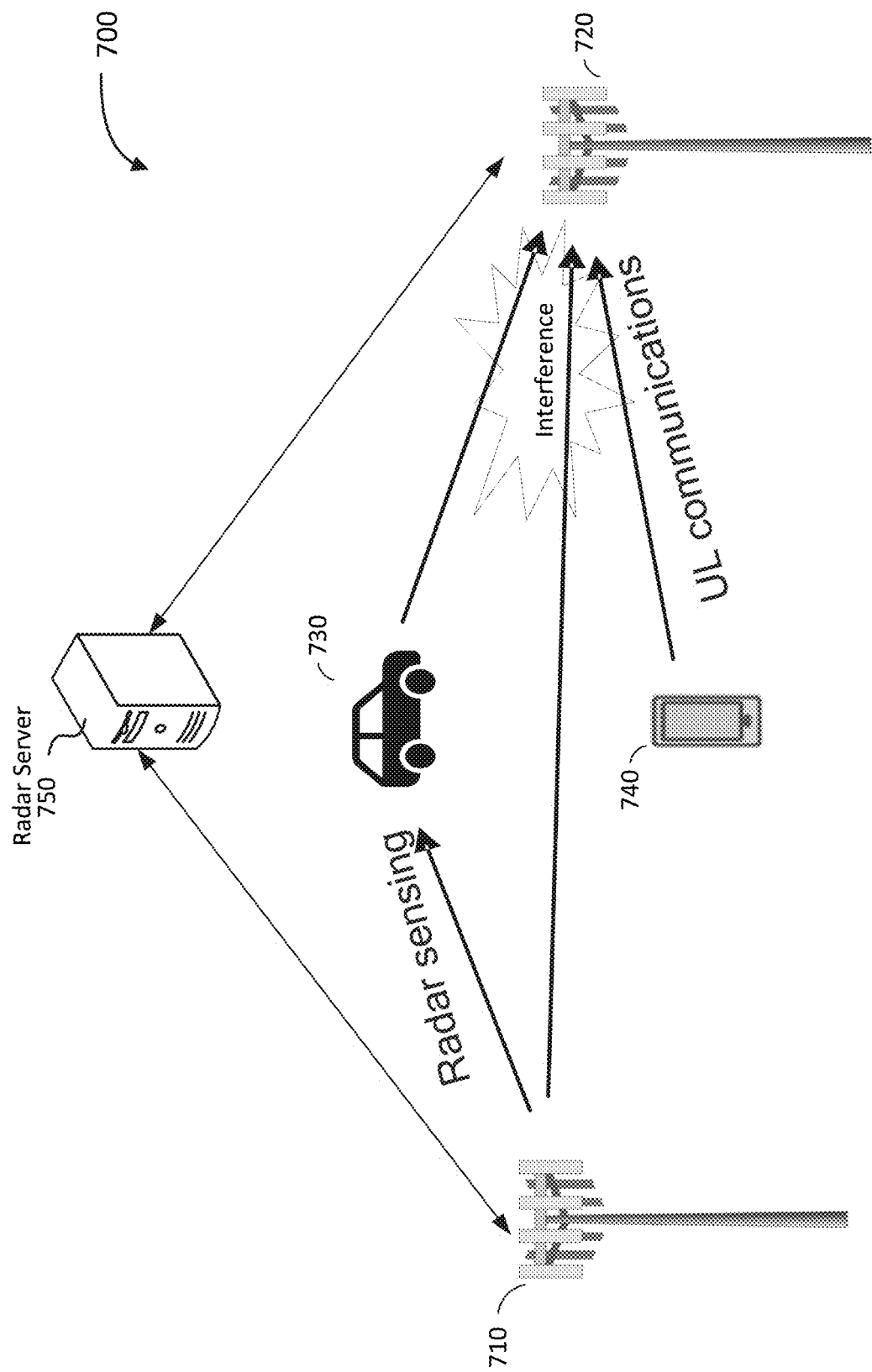
FIG. 7 illustrates an example of reducing interferences between radar signals and uplink data communication signals in a wireless system according to certain embodiments.

FIG. 7 illustrates an example of reducing interferences between radar signals and uplink data communication signals in a wireless system 700 according to certain embodiments. Wireless system 700 may be an example of wireless system 600, where a base station 720 may be the serving base station for a UE 740 and may receive uplink communications from UE 740. Base station 720 may also serve as a radar receiver of a bistatic radar. In the illustrated example, base station 720 may receive an LOS signal from a base station 710 (serving as the radar transmitter of the bistatic radar) and may also receive a deflected radar sensing signal from an object/target 730. The LOS signal and the deflected radar sensing signal may interfere with the uplink data communication signals received by base station 720 from UE 740.

To reduce or eliminate the interference of radar signals (including the LOS signal and the deflected radar sensing signal) with the uplink data communication signals, the serving base station (e.g., base station 720) may determine a list of resources used for uplink data communication and send the list of resources to a radar server 750, which may forward the list of resources to the radar transmitter (e.g., base station 710). The radar transmitter may then be configured to use resources other than those included in the list of resources received from radar server 750. Thus, the list of resources may be reserved for uplink data communications, such as Ultra-Reliable Low-Latency Communication (URLLC) traffic.

In some embodiments, there may be multiple radar transmitters in the wireless system, and the radar server may determine a muting pattern for the multiple radar transmitters. The radar server may then guide each radar transmitter to mute its radar signal transmission at certain slot/symbols, where high priority uplink data communication signals may be transmitted by the UE. In some embodiments, at most one radar transmitter may be allowed to transmit radar signals at certain slots/symbols. In some embodiments, all radar transmitters may be muted for some high priority UL communications, such as the URLLC traffic.

In some embodiments, the serving base station may report the list of resources for high priority UL transmission together with labels indicating the priority levels of the resources to assist the radar server for muting pattern configuration. For example, the resource reserved for URLLC uplink transmission may be labeled as having the highest priority level, and thus all radar transmitters may be guided by the radar server to mute their radar transmissions at the slots/symbols for the URLLC uplink transmission.

Figure 8:
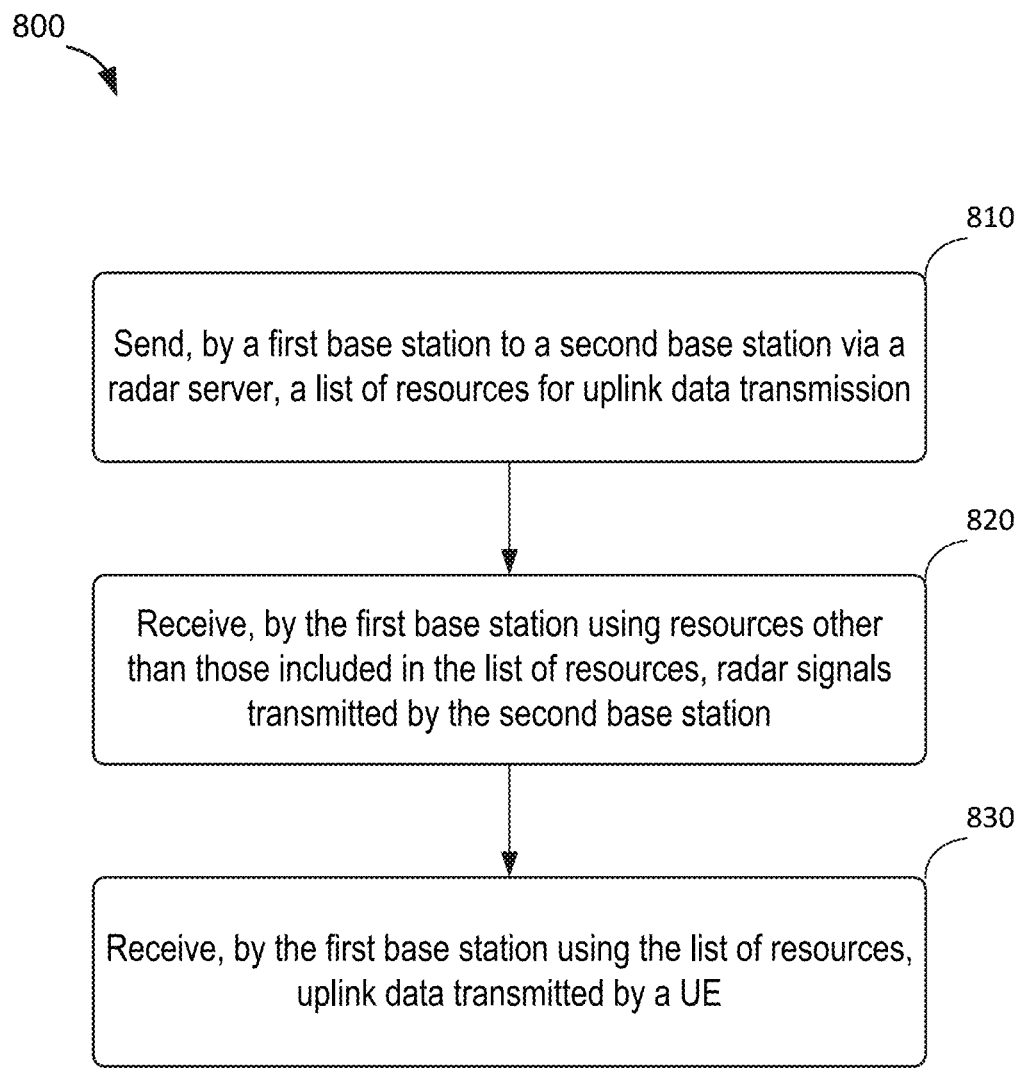
FIG. 8 includes a simplified flowchart illustrating an example of a method for reducing interferences between radar signals and uplink data communication signals in a wireless system by configuring the radar transmitter(s) according to certain embodiments.

FIG. 8 includes a simplified flowchart 800 illustrating an example of a method of reducing interferences between radar signals and uplink data communication signals in a wireless system by configuring the radar transmitter(s) according to certain embodiments. At block 810, a first base station may send, to a second base station via a radar server, a list of resources for uplink data transmission. The first base station may be the serving base station for a UE of the uplink data transmission and thus may receive the uplink data. The serving base station may communicate with the UE, for example, through certain assistance data, to determine or grant the resources used for the uplink data transmission, and may send the list to the radar server (e.g., radar server 750). The list of resources may include resources in the frequency domain (e.g., carrier frequencies), the time domain (e.g., slots/symbols), space domain (e.g., beam angles), and the like. As described above, the serving base station may also label the resources with their corresponding priority levels.

The radar server may send the list of resources or other information indicating the reservation of the list of resources (e.g., a muting pattern indicating the resources to avoid) to a second base station that serves as a radar transmitter. For example, the radar server may send the list of resources to one or more base stations of the neighbor cells, such as the second base station. In some examples, the radar server may, based on the list of resources, configure a muting pattern for one or more base stations serving as radar transmitters, and send the muting pattern or a respective portion of the muting pattern for each radar transmitter to the radar transmitter. The radar server may send the list of resources or the muting pattern in, for example, assistance data.

At block 820, the first base station may receive, using resources other than those included in the list of resources (since the resources in the list of resources are reserved for the higher-priority uplink data communications), radar signals transmitted by the second base station. The second base station may be configured according to the list of resources or the muting pattern received from the radar server to transmit radar signals using resources other than those included in the list of resources used for the high-priority uplink data communications. For example, the second base station may transmit radar signals using slots, symbols, and/or subcarriers that are different from the slots, symbols, and/or subcarriers used for the uplink data communication. The first base station may then receive the radar signals using slots, symbols, and/or subcarriers that are different from the slots, symbols, and/or subcarriers used for the uplink data communication.

At block 830, at the time the first base station receives the radar signal, the first base station may concurrently receive uplink data from the UE using resources in the list of resources. Thus, the first base station may receive both the uplink data transmitted by the UE using the list of resource and the radar signals transmitted by the second base station using resources other than those included in the list of resources. Because the uplink data and the radar signals use different (e.g., orthogonal) resources, the interference of the radar signals with the uplink data communication signals may be significantly reduced or substantially avoided. Therefore, the uplink data received by the first base station may have a high SINR.

According to some embodiments, the interference with the uplink data communication by the radar signal may additionally or alternatively be reduced or eliminated by tuning the serving base station (also serving as the radar receiver), such as base station 720. For example, the radar server (e.g., radar server 750) may communicate radar beam information about the transmitted radar beam to the serving base station. The radar beam information may include, for example, the boresight direction of the transmitted radar beam (e.g., the azimuth and/or elevation angles), the beam width (e.g., the 3 dB beam width), the uncertainty of the beam width, and the like. The boresight direction may be the Angle of Departure (AoD) of the radar transmitter (e.g., base station 710). As described above, the radar transmitter may use an antenna array with individually controllable antenna elements (e.g., controllable time/phase delays, powers, on/off states, etc.) to set the boresight direction and beam width. Based on the information regarding the transmitted radar beam, the serving base station may configure itself to receive the uplink data communication signals from a first beam (or angle of arrival) and receive the radar signals from a second beam (or angle of arrival) that does not collide with the first beam. As with the radar transmitter, the radar receiver may also include an antenna array that includes individually controllable antenna elements to set the receiving angle and the beam width for the uplink data communication beam or the radar beam. In this way, at least the radar interference from the LOS signal, which may generally have a higher power than the echo signal, may be mitigated.

In some embodiments, the radar beam information may be used by the serving base station to determine a default beam for the uplink data communication. In general, the serving base station may be able to select any receive beam for its reception. Thus, the serving base station may configure the default receive beam such that the default receive beam would not collide with the radar beam. In some scenarios, the serving base station may not have the channel and interference information for the radar beam, and thus a default beam may need to be pre-configured.

Figure 9:
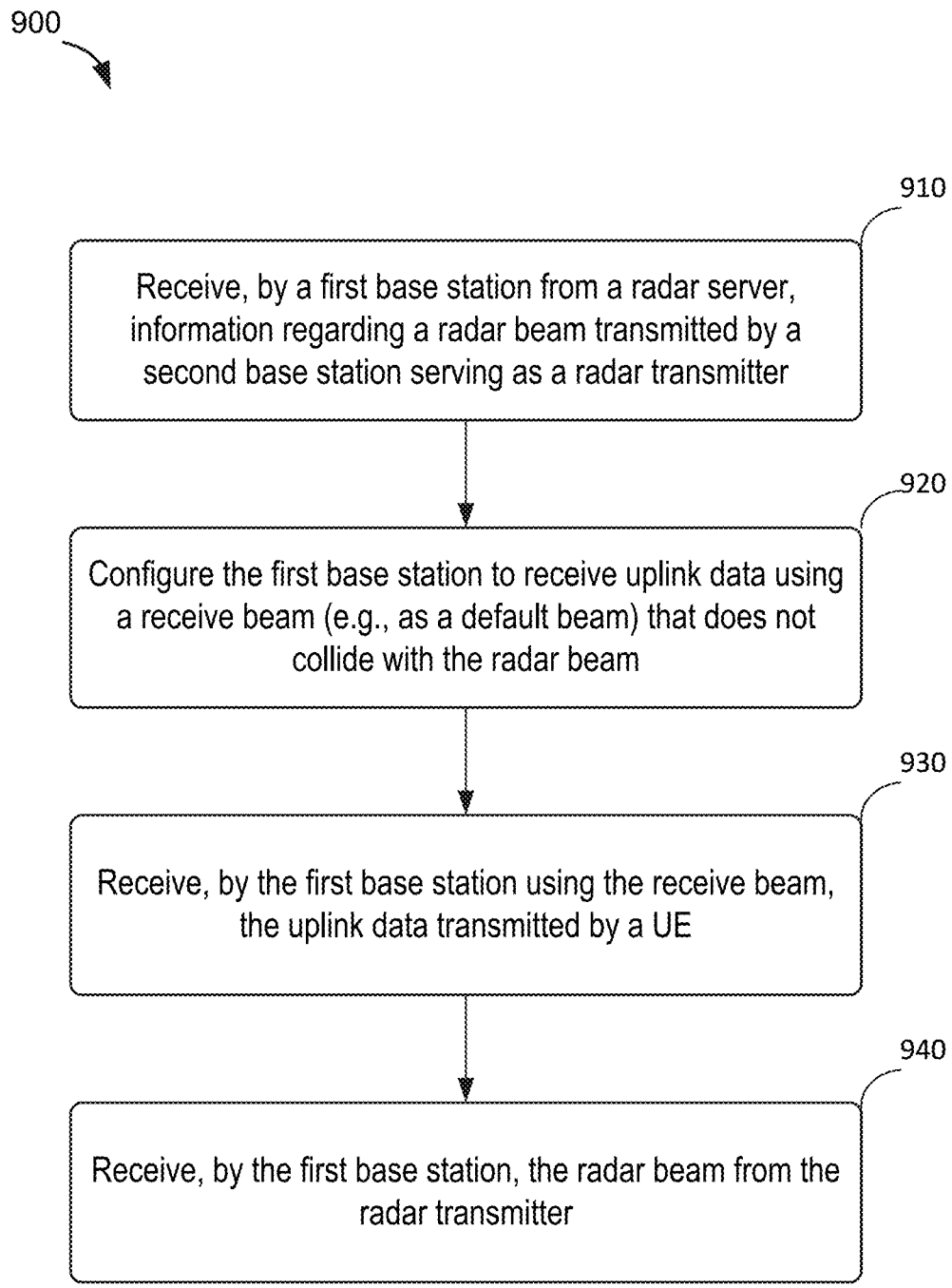
FIG. 9 includes a simplified flowchart illustrating an example of a method for reducing interferences between radar signals and uplink data communication signals in a wireless system by configuring the serving base station according to certain embodiments.

FIG. 9 includes a simplified flowchart 900 illustrating an example of a method for reducing interferences between radar signals and uplink data communication signals in a wireless system by configuring the serving base station according to certain embodiments. At block 910, a first base station may receive, from a radar server, information regarding a first radar beam transmitted by a second base station that serves as a radar transmitter. As described above, the information regarding the first radar beam may include, for example, the boresight direction of the transmitted radar beam (e.g., the azimuth and/or elevation or zenith angles), the beam width (e.g., the 3 dB beam width), the uncertainty of the beam width, and the like.

At block 920, the first base station may be configured to receive uplink data using a receive beam (e.g., a default receive beam) that does not collide with the radar beam. In some embodiments, the first base station may communicate with the UE to decide on the receive beam. As described above, the first base station may include an antenna array that includes individually controllable antenna elements, where the time/phase delays, the power levels, and the on/off states of the antenna element may be controlled to set the desired receiving angle and the beam width for the receive beam for the uplink data communication or the radar signal.

At block 930, the first base station may receive, using the receive beam, the uplink data transmitted by the UE. At block 940, the first base station may currently receive, using a different receive beam, the radar beam from the radar transmitter. Due to the different receive beams used by the serving base station, the interference of the uplink data by the radar signals may be reduced.

As described above with respect to, for example, FIG. 6, the radar signals for radar sensing may also interfere with downlink data communication signals. According to certain embodiments, to reduce or eliminate the interference of the radar signals with the downlink data communication signals, the serving base station (also serving as the radar transmitter) may be configured to transmit the downlink data communication signals that include at least one reference signal, such as the channel state information reference signals (CSI-RS), positioning reference signals (PRS), demodulation reference signals (DMRS), or tracking reference signals (TRS) signal in LTE or 5G NR, where the reference signal in the downlink data communication signals may also be used for radar sensing. Thus, the downlink transmission may be a beam for both downlink data communication and radar sensing. The serving base station may communicate to the radar receiver, for example, through the radar server, information regarding the downlink reference signal, such as the descrambling ID, sequence, and resource allocation of the downlink reference signal. The radar receiver may then configure itself to detect the downlink reference signal for radar sensing purposes.

In some embodiments, the reference signal may not be part of the data communication signals. For example, the serving base station may transmit a jointly optimized beam for both data communications and radar sensing, where the jointly optimized beam may include a Radar Reference Signal (RRS) for radar sensing. The RRS may be used as the Quasi Co-Location (QCL) source for CSI-RS, TRS, DMRS, Physical Downlink Shared Channel (PDSCH), and the like. When the radar beam including the RRS is updated, the serving base station may notify the UE of the updated QCL source for the downlink data reception. For example, if the updated radar beam is a jointly optimized beam for both downlink data communication and radar sensing, the updated radar beam can be used as a QCL source for the downlink reference signals/channels. If the updated radar beam is not a jointly optimized beam, the serving base station may configure another downlink and/or uplink reference signal as the UE's updated QCL source for downlink reference signals/channels.

Two antenna ports are quasi co-located if properties of the channel over which a symbol on one antenna port is conveyed can be inferred from the channel over which a symbol on the other antenna port is conveyed. Thus, QCL defines the correlation between symbols from different antenna ports. For example, in 5G NR, there may be four types of QCL relations. A QCL relation of a given type indicates that certain parameters regarding a second (target) reference RF signal on a second (target) beam can be derived from information about a first (source) reference RF signal on a first (source) beam, where the target beam and the source beam may experience similar channel conditions. Thus, the channel information estimated to detect the first (source) reference RF signal can help to detect the second (target) reference RF signal. More specifically, if the source reference RF signal is QCL Type A, the receiver may use the source reference RF signal to estimate the Doppler shift, Doppler spread, average delay, and delay spread of a second (target) reference RF signal on a radio channel having common properties as the radio channel for the source reference RF signal. If the source reference RF signal is QCL Type B, the receiver may use the source reference RF signal to estimate the Doppler shift and Doppler spread of a second reference RF signal transmitted on a radio channel. If the source reference RF signal is QCL Type C, the receiver may use the source reference RF signal to estimate the Doppler shift and the average delay of a second reference RF signal transmitted on a radio channel. If the source reference RF signal is QCL Type D, the receiver may use the source reference RF signal to estimate the spatial receive parameter of a second reference RF signal transmitted on a radio channel. The spatial receive parameter may refer to the beam forming properties of received downlink signals, such as the dominant AOA and the average AOA at the UE.

Figure 10:
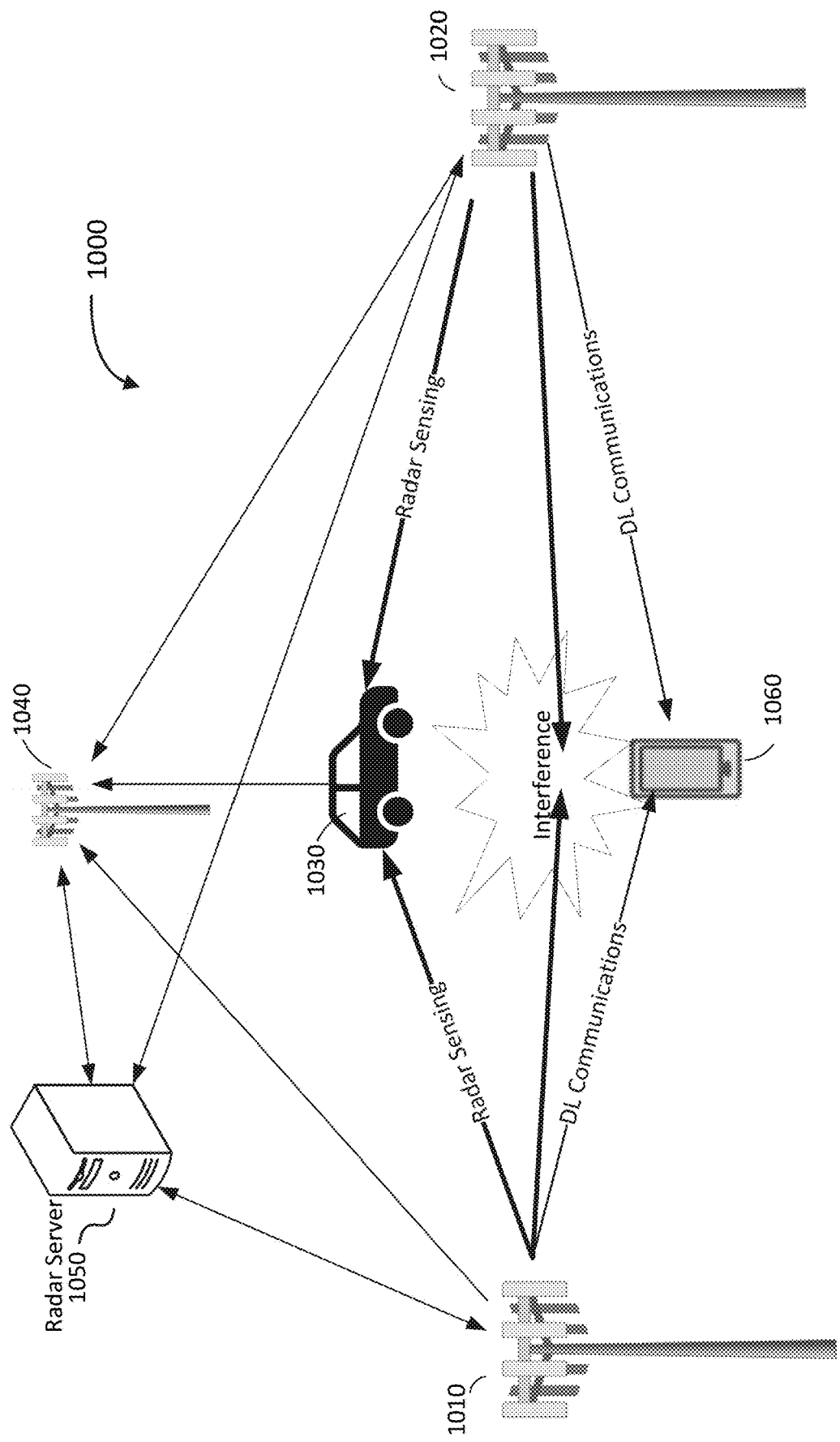
FIG. 10 illustrates an example of reducing interferences between radar signals and downlink data communication signals in a wireless system according to certain embodiments.

FIG. 10 illustrates an example of reducing interferences between radar signals and downlink data communication signals in a wireless system 1000 according to certain embodiments. Wireless system 1000 may be an example of wireless system 600, where a base station 1010 and/or a base station 1020 may be the serving base station for a UE 1060 and may send downlink communication signals to UE 1060. Base station 1010 or base station 1020 may also serve as a radar transmitter of a bistatic radar, where a base station 1040 may serve as the radar receiver of the bistatic radar. In the illustrated example, base station 1010 or 1020 may transmit both radar sensing signals (e.g., for detecting an object/target 1030) and downlink data communication signals. Thus, at UE 1060, the radar signals from the radar transmitters may interfere with the downlink data communication signals from the serving base station (e.g., base station 1010 or 1020).

To reduce or eliminate the interference of radar signals (including the LOS signal and the deflected radar sensing signal) with the downlink data communication signals, the serving base station 1020 (also serving as the radar transmitter) may be configured to transmit downlink data communication signals that include at least one reference signal, such as the CSI-RS, PRS, DMRS, or TRS signal in LTE or 5G NR, where the reference signal in the downlink data communication signals may also be used for radar sensing. Thus, the downlink transmission may be a beam for both downlink data communication and radar sensing. The serving base station 1020 may communicate to the radar receiver (e.g., base station 1040), for example, through a radar server 1050, information regarding the downlink reference signal, such as the descrambling ID, sequence, and resource allocation of the downlink reference signal. The radar receiver may then configure itself to detect the downlink reference signal for radar sensing purposes. In some embodiments, the serving base station 1010 or 1020 may transmit a jointly optimized beam for both data communications and radar sensing, where the jointly optimized beam may include a Radar Reference Signal (RRS) for radar sensing. The RRS may also be used as the QCL source for the CSI-RS, TRS, DMRS, PDSCH, and other reference signal channels.

Figure 11:
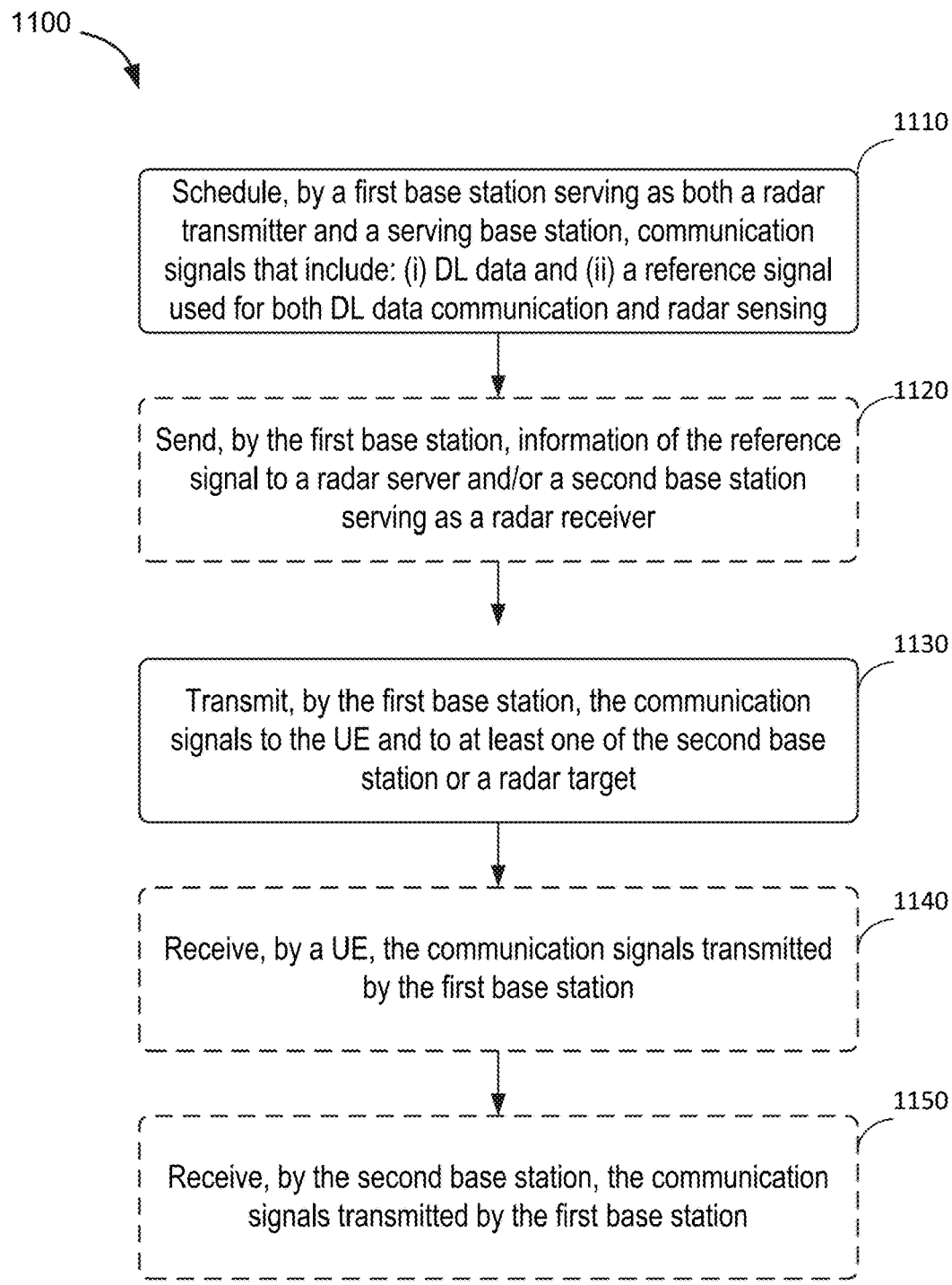
FIG. 11 includes a simplified flowchart illustrating an example of a method for reducing interferences between radar signals and downlink data communication signals in a wireless system by configuring the serving base station (or the radar transmitter) according to certain embodiments.

FIG. 11 includes a simplified flowchart 1100 illustrating an example of a method for reducing interferences between radar signals and downlink data communication signals in a wireless system by configuring the serving base station (or the radar transmitter) according to certain embodiments. A first base station serving as both a radar transmitter and a serving base station may initially schedule a downlink data communication that potentially collides with a radar signal. To prevent or reduce collision, the first base station may drop the radar signal and may instead use, in place of the dropped radar signal, one or more reference signals that can be used for radar sensing and for downlink data communication. As described above, such reference signals may include, for example, the CSI-RS, PRS, DMRS, or TRS signal in LTE or 5G NR, or the RRS signal for radar sensing. Thus, at block 1110, the first base station may schedule, for transmission by the first base station, communication signals that include the downlink data and a reference signal, where the reference signal (e.g., CSI-RS, PRS, DMRS, TRS, or RRS) can be used for downlink data communication (e.g., for receiving and decoding the downlink data) and also for radar sensing (e.g., as a signal that can be reflected off a target or as an LOS signal to be received by a second base station). In some embodiments, the communication signals including the downlink data and the reference signal may be transmitted in a jointly optimized beam.

Optionally, at block 1120, the first base station may send information regarding the reference signal to a radar server, or to a second base station via the radar server. The second base station may serve as the radar receiver, and may configure itself to receive and decode the reference signal for radar sensing.

At block 1130, the first base station may transit the communication signals that include the reference signal to the UE and may also transmit the same communication signals to a target object and/or the second base station.

Optionally, at block 1140, the UE may receive the communication signals transmitted by the first base station. For example, as described above, the UE may use the RRS as the QCL source for CSI-RS, TRS, DMRS, PDSCH, and the like, for receiving and decoding the downlink data. When the radar beam including the RRS is updated, the first base station may notify the UE of the updated QCL source for the downlink data reception.

Optionally, at block 1150, the second base station serving as the radar receiver may receive the communication signals that include the reference signal directly from the first base station (e.g., as LOS signals) and/or from the target object (e.g., as echo signals) for radar sensing.

Alternatively or additionally, the interference with the downlink data communication signals may be reduced or eliminated by adjusting the QCL source of the serving base station and tuning the UE to receive the downlink data communication signals from a beam that does not collide with the radar beam. For example, as shown in FIG. 10, a serving base station (e.g., base station 1010 or 1020) may receive information regarding a radar beam from radar server 1050 or a radar transmitter. The information regarding the radar beam may include, for example, the boresight direction of the transmitted radar beam (e.g., the azimuth and/or elevation angles), the beam width (e.g., the 3 dB beam width), the uncertainty of the beam width, and the like. The serving base station may then adjust its original QCL to mitigate reception interference. The information regarding the radar beam may also be communicated to the UE (e.g., UE 1060) by the serving base station, such that the UE may decide its default receive beam to be used before the UE receives the QCL configuration from Radio Resource Control (RRC) RRC and tunes based on the QCL configuration.

Figure 12:
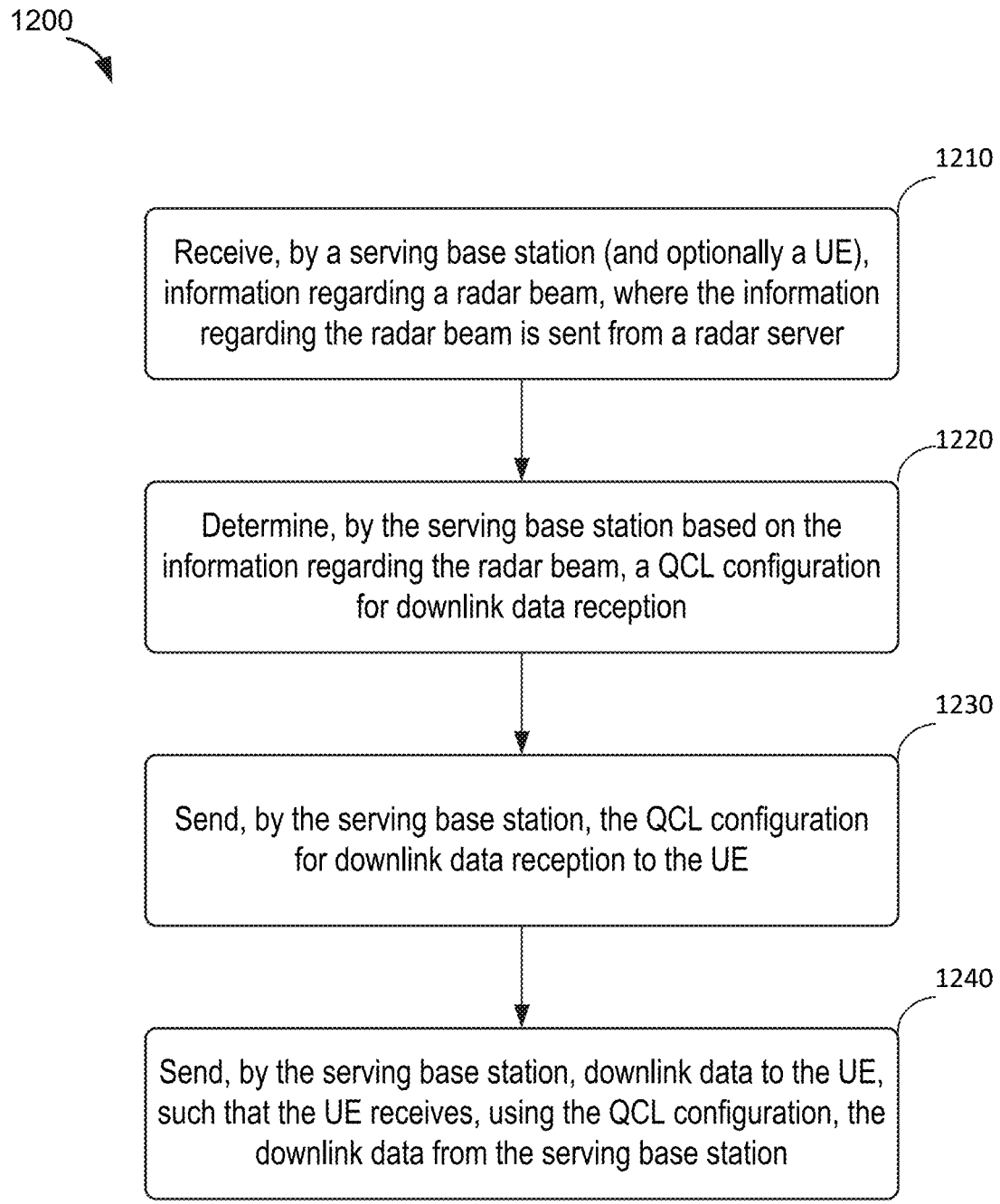
FIG. 12 includes a simplified flowchart illustrating an example of a method for reducing interferences between radar signals and downlink data communication signals in a wireless system by configuring the UE according to certain embodiments.

FIG. 12 includes a simplified flowchart 1200 illustrating an example of a method for reducing interferences between radar signals and downlink data communication signals in a wireless system by configuring the UE according to certain embodiments. At block 1210, a serving base station (and, optionally, a UE) may receive, from a radar server, information regarding a radar beam. The serving base station may correspond to base station 1010 in FIG. 10, the radar beam may correspond to an LOS signal transmitted by base station 1020 or an LOS signal transmitted by base station 1010, and downlink data may be data transmitted by either base station 1010 or base station 1020. The information regarding the radar beam may include, for example, the boresight direction of the transmitted radar beam (e.g., the azimuth and/or elevation angles), the beam width (e.g., the 3 dB beam width), the uncertainty of the beam width, and the like. If the UE also receives the information regarding the radar beam, the UE may determine, based on the information regarding the radar beam, a default receive beam for receiving downlink data. The default receive beam may not collide with the radar beam.

At block 1220, the serving base station may determine, based on the information regarding the radar beam, a QCL configuration for downlink data transmission to reduce the interference by the radar beam. The QCL configuration may indicate parameters for a receive beam to be generated by the UE and may be used by the UE to estimate, for example, spatial receive parameters (e.g., beam forming properties for QCL type D) of the downlink data. Thus, the serving base station may determine the QCL configuration such that the UE may be configured based on the QCL configuration to receive the downlink data using a receive beam that does not collide with the radar beam. If the radar beam is a radar beam transmitted by another base station, the serving base station may, in some implementations, also take into consideration a second radar beam transmitted by the serving base station, such that the QCL configuration determined by the serving base station enables the UE to generate a receive beam that may not collide with the second radar beam. Since the serving base station is transmitting the second radar beam, the serving base station may already have access to information regarding the second radar beam and therefore does not have to receive such information from the radar server. Further, the serving base station may send information regarding the second radar beam to the radar server for later transmission to the other base station (which can also be configured to perform the functionality depicted in FIG. 12) when the other base station later becomes the serving base station.

At block 1230, the serving base station may send the QCL configuration for downlink data reception to the UE. The UE may then configure itself based on the QCL configuration to receive the downlink data.

At block 1240, the serving base station may send downlink data to the UE, and the downlink data may be configured such that the UE may receive the downlink data from the serving base station using the QCL configuration (e.g., QCL type and source).

It is noted that the operations illustrated in FIGS. 8, 9, 11, and 12 provide particular interference reduction techniques. Other sequences of operations can also be performed according to alternative embodiments. For example, alternative embodiments may perform the operation in a different order. Moreover, the individual operations illustrated in FIGS. 8, 9, 11, and 12 can include multiple sub-operations that can be performed in various sequences as appropriate for the individual operation. Furthermore, some operations can be added or removed depending on the particular application. In some implementations, two or more operations may be performed in parallel. One of ordinary skill in the art would recognize many variations, modifications, and alternatives. In various embodiments, the means for performing the functionality illustrated in FIGS. 8, 9, 11, and 12 may include, for example, a UE, a base station (e.g., a TRP), and/or a radar server described herein, which may include hardware (e.g., transceivers and processors) and/or software components for performing the described functionality. For example, means for performing the operations in FIGS. 8, 9, 11, and 12 may include various components of a base station (TRP) or a UE, such as a wireless communication interface 1330, wireless communication antenna(s) 1332, a bus 1305, a digital signal processor (DSP) 1320, processing unit(s) 1310, memory 1360, and/or other components of a UE 105, one or more processing unit(s) 1410, a DSP 1420, a wireless communication interface 1430, a bus 1405, memory 1460, a network interface 1480, one or more wireless communication antenna(s) 1432, and the like, as illustrated in FIGS. 13 and 14 below.

Figure 13:
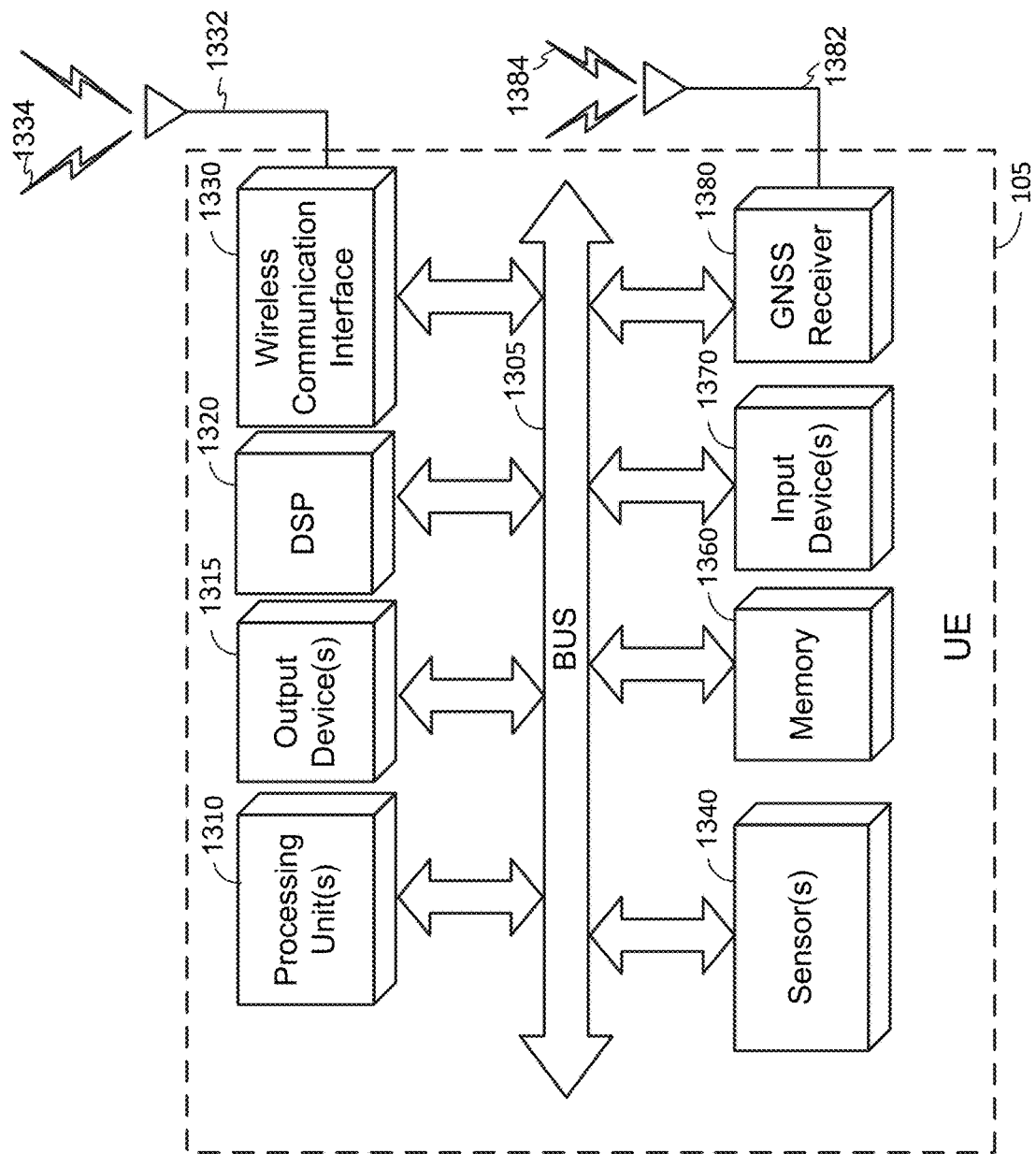
FIG. 13 illustrates an example of a UE according to certain embodiments.
Figure 14:
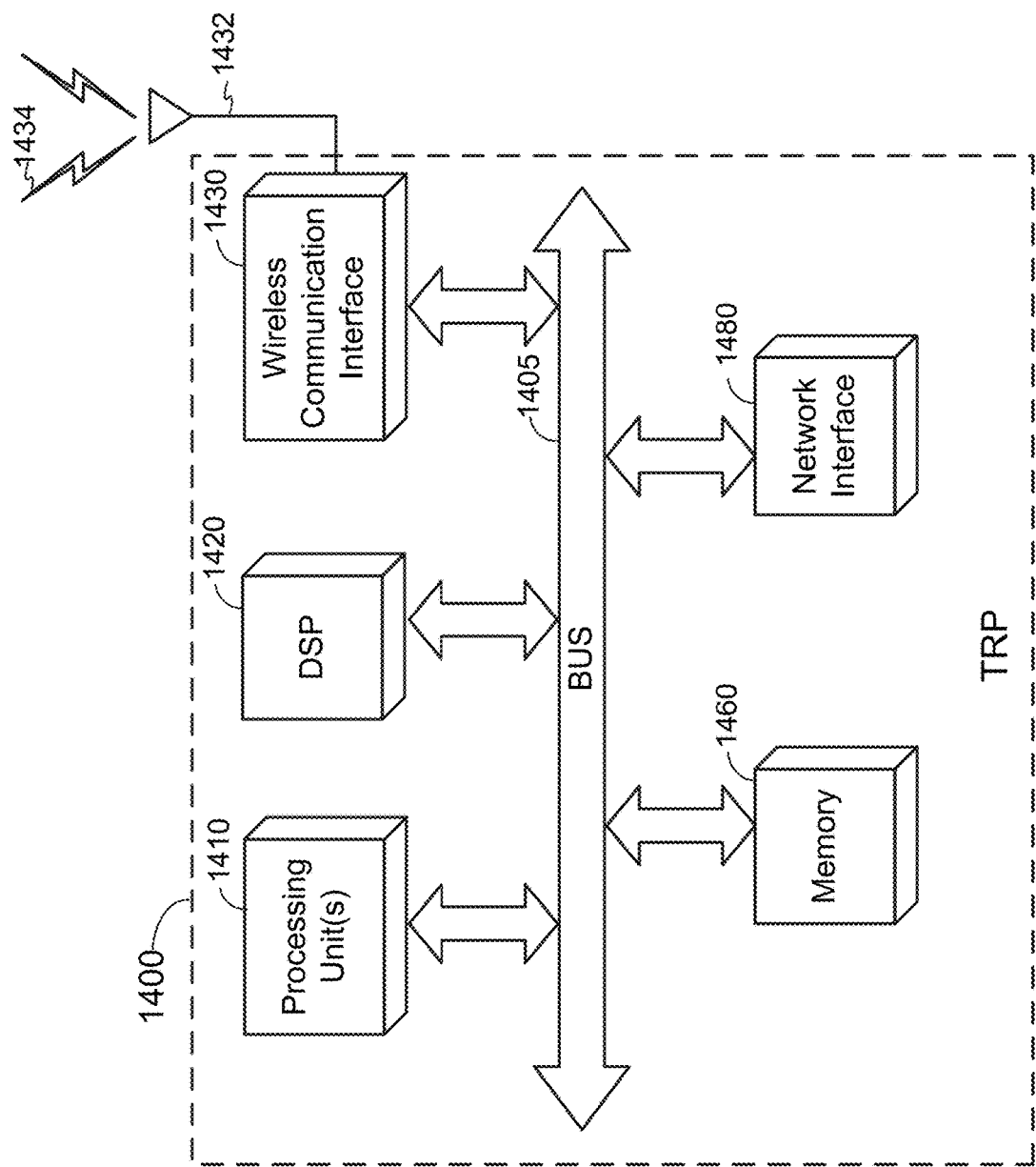
FIG. 14 illustrates an example of a base station according to certain embodiments.

FIG. 13 illustrates an embodiment of a UE 105, which can be utilized as described herein above. For example, the UE 105 may correspond to an implementation of UE 105 in any of the preceding figures and can perform one or more of the functions of the method shown in FIG. 12. It should be noted that FIG. 13 is meant only to provide a generalized illustration of various components, any or all of which may be utilized as appropriate. It can be noted that, in some instances, components illustrated by FIG. 13 can be localized to a single physical device and/or distributed among various networked devices, which may be disposed at different physical locations. Furthermore, as previously noted, the functionality of the UE discussed in the previously described embodiments may be executed by one or more of the hardware and/or software components illustrated in FIG. 13.

The UE 105 is shown comprising hardware elements that can be electrically coupled via a bus 1305 (or may otherwise be in communication, as appropriate). The hardware elements may include a processing unit(s) 1310 which can include without limitation one or more general-purpose processors, one or more special-purpose processors (such as DSP chips, graphics acceleration processors, application specific integrated circuits (ASICs), and/or the like), and/or other processing structures or means. As shown in FIG. 13, some embodiments may have a separate DSP 1320, depending on desired functionality. Location determination and/or other determinations based on wireless communication may be provided in the processing unit(s) 1310 and/or wireless communication interface 1330 (discussed below). The UE 105 also can include one or more input devices 1370, which can include without limitation one or more keyboards, touch screens, touch pads, microphones, buttons, dials, switches, and/or the like; and one or more output devices 1315, which can include without limitation one or more displays (e.g., touch screens), light emitting diodes (LEDs), speakers, and/or the like.

The UE 105 may also include a wireless communication interface 1330, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX device, a WAN device, and/or various cellular devices, etc.), and/or the like, which may enable the UE 105 to communicate with other devices as described in the embodiments above. As such, the wireless communication interface 1330 can include RF circuitry capable of being tuned between an active BWP and one or additional bands having one or more FLs used for PRS signals, as described herein. The wireless communication interface 1330 may permit data and signaling to be communicated (e.g., transmitted and received) with TRPs of a network, for example, via eNBs, gNBs, ng-eNBs, access points, various base stations and/or other access node types, and/or other network components, computer systems, and/or any other electronic devices communicatively coupled with TRPs, as described herein. The communication can be carried out via one or more wireless communication antenna(s) 1332 that send and/or receive wireless signals 1334. According to some embodiments, the wireless communication antenna(s) 1332 may comprise a plurality of discrete antennas, antenna arrays, or any combination thereof.

Depending on desired functionality, the wireless communication interface 1330 may comprise a separate receiver and transmitter, or any combination of transceivers, transmitters, and/or receivers to communicate with base stations (e.g., ng-eNBs and gNBs) and other terrestrial transceivers, such as wireless devices and access points. The UE 105 may communicate with different data networks that may comprise various network types. For example, a Wireless Wide Area Network (WWAN) may be a CDMA network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMAX (IEEE 802.16) network, and so on. A CDMA network may implement one or more RATs such as CDMA2000, WCDMA, and so on. CDMA2000 includes IS-95, IS-2000 and/or IS-856 standards. A TDMA network may implement GSM, Digital Advanced Mobile Phone System (D-AMPS), or some other RAT. An OFDMA network may employ LTE, LTE Advanced, 5G NR, and so on. 5G NR, LTE, LTE Advanced, GSM, and WCDMA are described in documents from 3GPP. CDMA2000 is described in documents from a consortium named "3rd Generation Partnership Project 3" (3GPP2). 3GPP and 3GPP2 documents are publicly available. A WLAN may also be an IEEE 802.11x network, and a wireless personal area network (WPAN) may be a Bluetooth network, an IEEE 802.15x, or some other type of network. The techniques described herein may also be used for any combination of WWAN, WLAN and/or WPAN.

The UE 105 can further include sensor(s) 1340. Sensors 1340 may comprise, without limitation, one or more inertial sensors and/or other sensors (e.g., accelerometer(s), gyroscope(s), camera(s), magnetometer(s), altimeter(s), microphone(s), proximity sensor(s), light sensor(s), barometer(s), and the like), some of which may be used to obtain position-related measurements and/or other information.

Embodiments of the UE 105 may also include a Global Navigation Satellite System (GNSS) receiver 1380 capable of receiving signals 1384 from one or more GNSS satellites using an antenna 1382 (which could be the same as wireless communication antenna 1332). Positioning based on GNSS signal measurement can be utilized to complement and/or incorporate the techniques described herein. The GNSS receiver 1380 can extract a position of the UE 105, using conventional techniques, from GNSS satellites 110 of a GNSS system, such as Global Positioning System (GPS), Galileo, GLONASS, Quasi-Zenith Satellite System (QZSS) over Japan, Indian Regional Navigational Satellite System (IRNSS) over India, BeiDou Navigation Satellite System (BDS) over China, and/or the like. Moreover, the GNSS receiver 1380 can be used with various augmentation systems (e.g., a Satellite Based Augmentation System (SBAS)) that may be associated with or otherwise enabled for use with one or more global and/or regional navigation satellite systems, such as, e.g., Wide Area Augmentation System (WAAS), European Geostationary Navigation Overlay Service (EGNOS), Multi-functional Satellite Augmentation System (MSAS), and Geo Augmented Navigation system (GAGAN), and/or the like.

It can be noted that, although GNSS receiver 1380 is illustrated in FIG. 13 as a distinct component, embodiments are not so limited. As used herein, the term "GNSS receiver" may comprise hardware and/or software components configured to obtain GNSS measurements (measurements from GNSS satellites). In some embodiments, therefore, the GNSS receiver may comprise a measurement engine executed (as software) by one or more processing units, such as processing unit(s) 1310, DSP 1320, and/or a processing unit within the wireless communication interface 1330 (e.g., in a modem). A GNSS receiver may optionally also include a positioning engine, which can use GNSS measurements from the measurement engine to determine a position of the GNSS receiver using an Extended Kalman Filter (EKF), Weighted Least Squares (WLS), a hatch filter, particle filter, or the like. The positioning engine may also be executed by one or more processing units, such as processing unit(s) 1310 or DSP 1320.

The UE 105 may further include and/or be in communication with a memory 1360. The memory 1360 can include, without limitation, local and/or network accessible storage, a disk drive, a drive array, an optical storage device, a solid-state storage device, such as a random access memory (RAM), and/or a read-only memory (ROM), which can be programmable, flash-updateable, and/or the like. Such storage devices may be configured to implement any appropriate data stores, including without limitation, various file systems, database structures, and/or the like.

The memory 1360 of the UE 105 also can comprise software elements (not shown in FIG. 13), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 1360 that are executable by the UE 105 (and/or processing unit(s) 1310 or DSP 1320 within UE 105). In an aspect, then such code and/or instructions can be used to configure and/or adapt a general-purpose computer (or other device) to perform one or more operations in accordance with the described methods.

FIG. 14 illustrates an embodiment of a TRP 1400, which can be utilized as described herein above (e.g., in association with FIGS. 1-15). It should be noted that FIG. 14 is meant only to provide a generalized illustration of various components, any or all of which may be utilized as appropriate.

The TRP 1400 is shown comprising hardware elements that can be electrically coupled via a bus 1405 (or may otherwise be in communication, as appropriate). The hardware elements may include a processing unit(s) 1410 which can include without limitation one or more general-purpose processors, one or more special-purpose processors (such as DSP chips, graphics acceleration processors, ASICs, and/or the like), and/or other processing structure or means. As shown in FIG. 14, some embodiments may have a separate DSP 1420, depending on desired functionality. Location determination and/or other determinations based on wireless communication may be provided in the processing unit(s) 1410 and/or wireless communication interface 1430 (discussed below), according to some embodiments. The TRP 1400 also can include one or more input devices, which can include without limitation a keyboard, display, mouse, microphone, button(s), dial(s), switch(es), and/or the like; and one or more output devices, which can include without limitation a display, light emitting diode (LED), speakers, and/or the like.

The TRP 1400 might also include a wireless communication interface 1430, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX device, cellular communication facilities, etc.), and/or the like, which may enable the TRP 1400 to communicate as described herein. The wireless communication interface 1430 may permit data and signaling to be communicated (e.g., transmitted and received) to UEs, other base stations/TRPs (e.g., eNBs, gNBs, and ng-eNBs), and/or other network components, computer systems, and/or any other electronic devices described herein. The communication can be carried out via one or more wireless communication antenna(s) 1432 that send and/or receive wireless signals 1434.

The TRP 1400 may also include a network interface 1480, which can include support of wireline communication technologies. The network interface 1480 may include a modem, network card, chipset, and/or the like. The network interface 1480 may include one or more input and/or output communication interfaces to permit data to be exchanged with a network, communication network servers, computer systems, and/or any other electronic devices described herein.

In many embodiments, the TRP 1400 may further comprise a memory 1460. The memory 1460 can include, without limitation, local and/or network accessible storage, a disk drive, a drive array, an optical storage device, a solid-state storage device, such as a RAM, and/or a ROM, which can be programmable, flash-updateable, and/or the like. Such storage devices may be configured to implement any appropriate data stores, including without limitation, various file systems, database structures, and/or the like.

The memory 1460 of the TRP 1400 also may comprise software elements (not shown in FIG. 14), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 1460 that are executable by the TRP 1400 (and/or processing unit(s) 1410 or DSP 1420 within TRP 1400). In an aspect, then such code and/or instructions can be used to configure and/or adapt a general-purpose computer (or other device) to perform one or more operations in accordance with the described methods.

Figure 15:
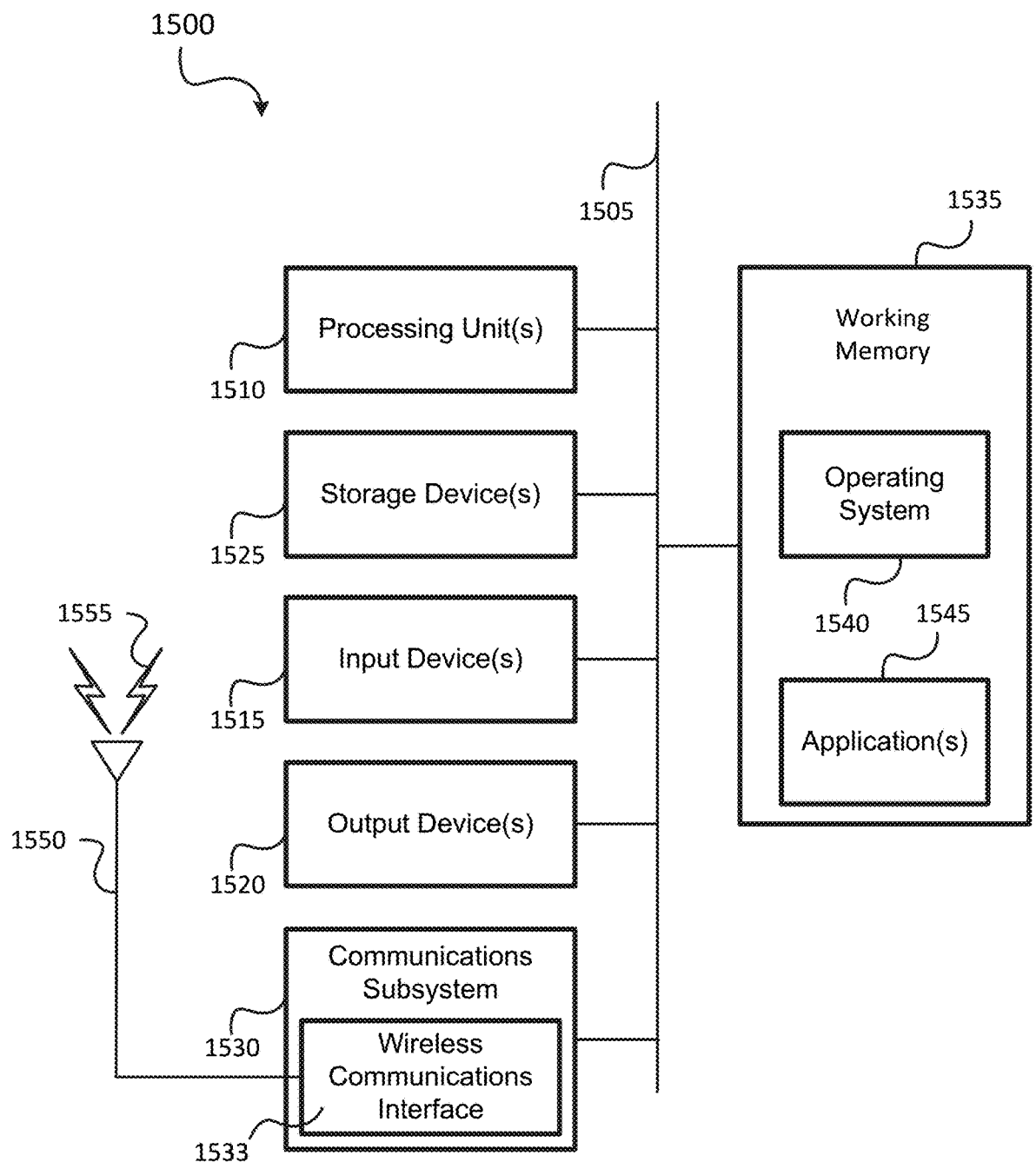
FIG. 15 is a block diagram of an example of a computer system, which may be used, in whole or in part, to provide the functions of one or more network components.

FIG. 15 is a block diagram of an embodiment of a computer system 1500, which may be used, in whole or in part, to provide the functions of one or more network components as described in the embodiments herein (e.g., radar server 160 of FIG. 1, LMF 220 of FIG. 2, etc.). It should be noted that FIG. 15 is meant only to provide a generalized illustration of various components, any or all of which may be utilized as appropriate. FIG. 15, therefore, broadly illustrates how individual system elements may be implemented in a relatively separated or relatively more integrated manner. In addition, it can be noted that components illustrated by FIG. 15 can be localized to a single device and/or distributed among various networked devices, which may be disposed at different geographical locations.

The computer system 1500 is shown comprising hardware elements that can be electrically coupled via a bus 1505 (or may otherwise be in communication, as appropriate). The hardware elements may include processing unit(s) 1510, which may comprise without limitation one or more general-purpose processors, one or more special-purpose processors (such as digital signal processing chips, graphics acceleration processors, and/or the like), and/or other processing structure, which can be configured to perform one or more of the methods described herein. The computer system 1500 also may comprise one or more input devices 1515, which may comprise without limitation a mouse, a keyboard, a camera, a microphone, and/or the like; and one or more output devices 1520, which may comprise without limitation a display device, a printer, and/or the like.

The computer system 1500 may further include (and/or be in communication with) one or more non-transitory storage devices 1525, which can comprise, without limitation, local and/or network accessible storage, and/or may comprise, without limitation, a disk drive, a drive array, an optical storage device, a solid-state storage device, such as a RAM and/or ROM, which can be programmable, flash-updateable, and/or the like. Such storage devices may be configured to implement any appropriate data stores, including without limitation, various file systems, database structures, and/or the like. Such data stores may include database(s) and/or other data structures used store and administer messages and/or other information to be sent to one or more devices via hubs, as described herein.

The computer system 1500 may also include a communications subsystem 1530, which may comprise wireless communication technologies managed and controlled by a wireless communication interface 1533, as well as wired technologies (such as Ethernet, coaxial communications, universal serial bus (USB), and the like). The wireless communication interface 1533 may send and receive wireless signals 1555 (e.g., signals according to 5G NR or LTE) via wireless antenna(s) 1550. Thus the communications subsystem 1530 may comprise a modem, a network card (wireless or wired), an infrared communication device, a wireless communication device, and/or a chipset, and/or the like, which may enable the computer system 1500 to communicate on any or all of the communication networks described herein to any device on the respective network, including a User Equipment (UE), base stations and/or other TRPs, and/or any other electronic devices described herein. Hence, the communications subsystem 1530 may be used to receive and send data as described in the embodiments herein.

In many embodiments, the computer system 1500 will further comprise a working memory 1535, which may comprise a RAM or ROM device, as described above. Software elements, shown as being located within the working memory 1535, may comprise an operating system 1540, device drivers, executable libraries, and/or other code, such as one or more applications 1545, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processing unit within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 1525 described above. In some cases, the storage medium might be incorporated within a computer system, such as computer system 1500. In other embodiments, the storage medium might be separate from a computer system (e.g., a removable medium, such as an optical disc), and/or provided in an installation package, such that the storage medium can be used to program, configure, and/or adapt a general purpose computer with the instructions/code stored thereon. These instructions might take the form of executable code, which is executable by the computer system 1500 and/or might take the form of source and/or installable code, which, upon compilation and/or installation on the computer system 1500 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media, volatile media, and transmission media. Common forms of computer-readable media include, for example, magnetic and/or optical media, any other physical medium with patterns of holes, a RAM, a programmable ROM (PROM), erasable PROM (EPROM), a FLASH-EPROM, any other memory chip or cartridge, a carrier wave as described hereinafter, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussion utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the spirit of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

In view of this description embodiments may include different combinations of features. Implementation examples are described in the following numbered clauses:

Clause 1. A method comprising, by a first base station: sending, to a second base station, a list of resources for uplink data transmission from a user equipment (UE) to the first base station; receiving, using resources other than those included in the list of resources, radar signals from the second base station; and receiving, using resources included in the list of resources, the uplink data from the UE.

Clause 2. The method of clause 1, wherein the list of resources includes a list of frequency domain and time domain resources for transmitting radio frequency signals carrying the uplink data.

Clause 3. The method of clause 1 or 2, wherein sending the list of resources to the second base station comprises sending, via a radar server, the list of resources to the second base station.

Clause 4. The method of clause 3, further comprising sending a respective priority level associated with each resource of the list of resources to the radar server.

Clause 5. The method of clause 4, further comprising: determining, by the radar server based on the respective priority level, a schedule for muting transmission of the radar signals from the second base station; and sending, by the radar server, the schedule for muting transmission of the radar signals from the second base station to the second base station.

Clause 6. The method of any of clauses 1-5, wherein the uplink data includes Ultra-Reliable Low-Latency Communication (URLLC) data.

Clause 7. The method of any of clauses 1-6, wherein the first base station is a serving base station for the UE and is also a radar receiver of a bistatic radar system, and wherein the second base station is a radar transmitter of the bistatic radar system.

Clause 8. The method of any of clauses 1-7, wherein the first base station receives the uplink data through wireless communication according to Long-Term Evolution (LTE), Fifth Generation (5G) New Radio (NR), or Sixth Generation (6G) Radio Access Technologies (RATs).

Clause 9. The method of any of clauses 1-8, wherein resources used by the first base station to receive the uplink data and resources used by the first base station to receive the radar signals differ with respect to at least one of slots, symbols, or subcarriers.

Clause 10. A first base station comprising: a wireless communication interface operable to receive radio frequency signals carrying data and to receive radar signals from which attributes of a radar target can be determined; and one or more processing units configured to cause the wireless communication interface to: send, to a second base station, a list of resources for uplink data transmission from a user equipment (UE) to the first base station; receive, using resources other than those included in the list of resources and as part of the radar signals from which the attributes of the radar target can be determined, radar signals from the second base station; and receive, using resources included in the list of resources, the uplink data from the UE.

Clause 11. The first base station of clause 10, wherein the list of resources includes a list of frequency domain and time domain resources for transmitting radio frequency signals carrying the uplink data.

Clause 12. The first base station of clause 10 or 11, wherein the wireless communication interface sends the list of resources to the second base station via a radar server.

Clause 13. The first base station of clause 12, wherein the one or more processing units are configured to cause the wireless communication interface to send a respective priority level associated with each resource of the list of resources to the radar server.

Clause 14. The first base station of clause 13, wherein the wireless communication interface receives the radar signals from the second base station according to a schedule for muting transmission of the radar signals from the second base station, and wherein the schedule is determined by the radar server.

Clause 15. The first base station of any of clauses 10-14, wherein the uplink data includes Ultra-Reliable Low-Latency Communication (URLLC) data.

Clause 16. The first base station of any of clauses 10-15, wherein the first base station is a serving base station for the UE and is also a radar receiver of a bistatic radar system, and wherein the second base station is a radar transmitter of the bistatic radar system.

Clause 17. The first base station of any of clauses 10-16, wherein the wireless communication interface is configured to receive the uplink data through wireless communication according to Long-Term Evolution (LTE), Fifth Generation (5G) New Radio (NR), or Sixth Generation (6G) Radio Access Technologies (RATs).

Clause 18. The first base station of any of clauses 10-17, wherein resources used by the first base station to receive the uplink data and resources used by the first base station to receive the radar signals differ with respect to at least one of slots, symbols, or subcarriers.

Clause 19. A non-transitory computer-readable medium having instructions stored thereon, wherein the instructions, when executed by one or more processing units of a first base station, cause the one or more processing units to perform the following: sending, to a second base station, a list of resources for uplink data transmission from a user equipment (UE) to the first base station; receiving, using resources other than those included in the list of resources, radar signals from the second base station; and receiving, using resources included in the list of resources, the uplink data from the UE.

Clause 20. The non-transitory computer-readable medium of clause 19, wherein the list of resources includes a list of frequency domain and time domain resources for transmitting radio frequency signals carrying the uplink data.

Clause 21. The non-transitory computer-readable medium of clause 19 or 20, wherein sending the list of resources to the second base station comprises sending, via a radar server, the list of resources to the second base station.

Clause 22. The non-transitory computer-readable medium of clause 21, wherein the instructions further cause the one or more processing units to send a respective priority level associated with each resource of the list of resources to the radar server.

Clause 23. The non-transitory computer-readable medium of clause 22, wherein the radar signals from the second base station are received according to a schedule for muting transmission of the radar signals from the second base station, and wherein the schedule is determined by the radar server.

Clause 24. The non-transitory computer-readable medium of any of clauses 19-23, wherein the uplink data includes Ultra-Reliable Low-Latency Communication (URLLC) data.

Clause 25. The non-transitory computer-readable medium of any of clauses 19-24, wherein the first base station is a serving base station for the UE and is also a radar receiver of a bistatic radar system, and wherein the second base station is a radar transmitter of the bistatic radar system.

Clause 26. The non-transitory computer-readable medium of any of clauses 19-25, wherein the first base station is configured to receive the uplink data through wireless communication according to Long-Term Evolution (LTE), Fifth Generation (5G) New Radio (NR), or Sixth Generation (6G) Radio Access Technologies (RATs).

Clause 27. The non-transitory computer-readable medium of any of clauses 19-26, wherein resources used by the first base station to receive the uplink data and resources used by the first base station to receive the radar signals differ with respect to at least one of slots, symbols, or subcarriers.

Clause 28. A system comprising: a wireless communication interface operable to receive radio frequency signals carrying data and to receive radar signals from which attributes of a radar target can be determined; and means for sending, to a base station, a list of resources for uplink data transmission from a user equipment (UE) to the system; means for configuring the wireless communication interface to receive, using resources other than those included in the list of resources and as part of the radar signals from which the attributes of the radar target can be determined, radar signals from the base station; and means for configuring the wireless communication interface to receive, using resources included in the list of resources, the uplink data from the UE.

Clause 29. The system of clause 28, wherein resources used by the wireless communication interface to receive the uplink data and resources used by the wireless communication interface to receive the radar signals differ with respect to at least one of slots, symbols, or subcarriers.

Clause 30. The system of clause 28 or 29, wherein the wireless communication interface is part of a serving base station for the UE, wherein the serving base station is also a radar receiver of a bistatic radar system, and wherein the base station from which the radar signals are received is a radar transmitter of the bistatic radar system.

Clause 31. A method comprising, by a first base station: receiving, from a radar server, information regarding a radar beam transmitted by a second base station serving as a radar transmitter; determining, using the information regarding the radar beam, parameters of a receive beam for receiving uplink data from a User Equipment (UE), wherein the parameters are determined such that the receive beam does not collide with the radar beam; receiving, using the receive beam, the uplink data from the UE; and receiving the radar beam from the second base station.

Clause 32. The method of clause 31, wherein the information regarding the radar beam includes at least one of a boresight direction, a beam width, or an uncertainty of the beam width of the radar beam.

Clause 33. The method of clause 31 or 32, further comprising determining, based on the information regarding the radar beam, a default receive beam for uplink data communication, wherein the default receive beam does not collide with the radar beam.

Clause 34. The method of any of clauses 31-33, wherein receiving the uplink data using the receive beam comprises configuring an antenna array to form the receive beam.

Clause 35. The method of clause 34, wherein determining the parameters of the receive beam comprises determining at least one of a time delay, a phase delay, a power level, or an on/off state of an antenna element in the antenna array, to set a receiving angle or beam width of the receive beam.

Clause 36. The method of any of clauses 31-35, wherein the information regarding the radar beam is received by the first base station as assistance data from the radar server.

Clause 37. The method of any of clauses 31-36, wherein the uplink data and the radar beam are received concurrently.

Clause 38. The method of any of clauses 31-37, wherein the radar beam corresponds to a line of sight (LOS) signal.

Clause 39. The method of clause 38, further comprising: receiving an echo signal, the echo signal being a radar signal transmitted from the second base station and reflected off a radar target; and processing the LOS signal and the echo signal to determine one or more attributes of the radar target.

Clause 40. A first base station comprising: an antenna array; a wireless communication interface communicatively coupled to the antenna array; and one or more processing units configured to: receive, from a radar server and through the wireless communication interface, information regarding a radar beam transmitted by a second base station serving as a radar transmitter; determine, using the information regarding the radar beam, parameters of a receive beam for receiving uplink data from a User Equipment (UE), wherein the parameters are determined such that the receive beam does not collide with the radar beam; receive, through the wireless communication interface and using the receive beam, the uplink data from the UE; and receive, through the wireless communication interface, the radar beam from the second base station.

Clause 41. The first base station of clause 40, wherein the information regarding the radar beam includes at least one of a boresight direction, a beam width, or an uncertainty of the beam width of the radar beam.

Clause 42. The first base station of clause 40 or 41, wherein the one or more processing units are further configured to determine, based on the information regarding the radar beam, a default receive beam for uplink data communication, and wherein the default receive beam does not collide with the radar beam.

Clause 43. The first base station of any of clauses 40-42, wherein to receive the uplink data, the one or more processing units configure the antenna array to form the receive beam.

Clause 44. The first base station of clause 43, wherein to determine the parameters of the receive beam, the one or more processing units determine at least one of a time delay, a phase delay, a power level, or an on/off state of an antenna element in the antenna array, to set a receiving angle or beam width of the receive beam.

Clause 45. The first base station of any of clauses 40-44, wherein the information regarding the radar beam is received as assistance data from the radar server.

Clause 46. The first base station of any of clauses 40-45, wherein the uplink data and the radar beam are received concurrently.

Clause 47. The first base station of any of clauses 40-46, wherein the radar beam corresponds to a line of sight (LOS) signal.

Clause 48. The first base station of clause 47, wherein the one or more processing units are further configured to: receive an echo signal through the wireless communication interface, the echo signal being a radar signal transmitted from the second base station and reflected off a radar target; and process the LOS signal and the echo signal to determine one or more attributes of the radar target.

Clause 49. A non-transitory computer-readable medium having instructions stored thereon, wherein the instructions, when executed by one or more processing units of a first base station, cause the one or more processing units to perform the following: receiving, from a radar server, information regarding a radar beam transmitted by a second base station serving as a radar transmitter; determining, using the information regarding the radar beam, parameters of a receive beam for receiving uplink data from a User Equipment (UE), wherein the parameters are determined such that the receive beam does not collide with the radar beam; receiving, using the receive beam, the uplink data from the UE; and receiving the radar beam from the second base station.

Clause 50. The non-transitory computer-readable medium of clause 49, wherein the information regarding the radar beam includes at least one of a boresight direction, a beam width, or an uncertainty of the beam width of the radar beam.

Clause 51. The non-transitory computer-readable medium of clause 49 or 50, wherein the instructions further cause the one or more processing units to determine, based on the information regarding the radar beam, a default receive beam for uplink data communication, wherein the default receive beam does not collide with the radar beam.

Clause 52. The non-transitory computer-readable medium of any of clauses 49-51, wherein receiving the uplink data using the receive beam comprises configuring an antenna array to form the receive beam.

Clause 53. The non-transitory computer-readable medium of clause 52, wherein determining the parameters of the receive beam comprises determining at least one of a time delay, a phase delay, a power level, or an on/off state of an antenna element in the antenna array, to set a receiving angle or beam width of the receive beam.

Clause 54. The non-transitory computer-readable medium of any of clauses 49-53, wherein the information regarding the radar beam is received by the first base station as assistance data from the radar server.

Clause 55. The non-transitory computer-readable medium of any of clauses 49-54, wherein the uplink data and the radar beam are received concurrently.

Clause 56. The non-transitory computer-readable medium of any of clauses 49-55, wherein the radar beam corresponds to a line of sight (LOS) signal.

Clause 57. The non-transitory computer-readable medium of clause 56, wherein the instructions further cause the one or more processing units to: receive an echo signal, the echo signal being a radar signal transmitted from the second base station and reflected off a radar target; and process the LOS signal and the echo signal to determine one or more attributes of the radar target.

Clause 58. A system comprising: a wireless communication interface configured to receive, from a radar server, information regarding a radar beam transmitted by a base station serving as a radar transmitter; means for determining, using the information regarding the radar beam, parameters of a receive beam for receiving uplink data from a User Equipment (UE), wherein the parameters are determined such that the receive beam does not collide with the radar beam; and means for configuring the wireless communication interface to receive: the uplink data from the UE, using the receive beam; and the radar beam from the base station.

Clause 59. The system of clause 58, wherein the information regarding the radar beam includes at least one of a boresight direction, a beam width, or an uncertainty of the beam width of the radar beam.

Clause 60. The system of clause 58 or 59, wherein the means for determining the parameters of the receive beam is configured to determine at least one of a time delay, a phase delay, a power level, or an on/off state of an antenna element in an antenna array, to set a receiving angle or beam width of the receive beam.

Clause 61. A method comprising, by a first base station serving as both a radar transmitter and a serving base station for a User Equipment (UE): scheduling communication signals that include downlink data and a reference signal, wherein the reference signal is usable for both downlink data communication and radar sensing; sending information regarding the reference signal to a second base station serving as a radar receiver; and transmitting, by the first base station, the communication signals that include the downlink data and the reference signal to the UE and to at least one of the second base station or a radar target.

Clause 62. The method of clause 61, wherein the reference signal includes at least one of a channel state information reference signal (CSI-RS), positioning reference signal (PRS), demodulation reference signal (DMRS), or tracking reference signal (TRS).

Clause 63. The method of clause 61 or 62, wherein the reference signal includes a Radar Reference Signal (RRS).

Clause 64. The method of clause 63, wherein the RRS is used as a Quasi-Colocation (QCL) source for a channel state information reference signal (CSI-RS), a tracking reference signal (TRS), a demodulation reference signal (DMRS), or a Physical Downlink Shared Channel (PDSCH) in Long-Term Evolution (LTE), Fifth Generation (5G) New Radio (NR), or Sixth Generation (6G) Radio Access Technologies (RATs).

Clause 65. The method of any of clauses 61-64, wherein the information regarding the reference signal includes at least one of a descrambling ID, sequence, or resource allocation of the reference signal.

Clause 66. The method of any of clauses 61-65, wherein sending the information regarding the reference signal to the second base station comprises sending, via a radar server, the information regarding the reference signal to the second base station.

Clause 67. The method of any of clauses 61-66, wherein the communication signals are transmitted to the second base station as a line of sight (LOS) signal and to the radar target for reflection off the radar target.

Clause 68. A first base station serving as both a radar transmitter and a serving base station for a User Equipment (UE), the first base station comprising: a wireless communication interface; and one or more processing units configured to: schedule, for transmission through the wireless communication interface, communication signals that include downlink data and a reference signal, wherein the reference signal is usable for both downlink data communication and radar sensing; send information regarding the reference signal to a second base station serving as a radar receiver; and transmit, through the wireless communication interface, the communication signals that include the downlink data and the reference signal to the UE and to at least one of the second base station or a radar target.

Clause 69. The first base station of clause 68, wherein the reference signal includes at least one of a channel state information reference signal (CSI-RS), positioning reference signal (PRS), demodulation reference signal (DMRS), or tracking reference signal (TRS).

Clause 70. The first base station of clause 68 or 69, wherein the reference signal includes a Radar Reference Signal (RRS).

Clause 71. The first base station of clause 70, wherein the RRS is used as a Quasi-Colocation (QCL) source for a channel state information reference signal (CSI-RS), a tracking reference signal (TRS), a demodulation reference signal (DMRS), or a Physical Downlink Shared Channel (PDSCH) in Long-Term Evolution (LTE), Fifth Generation (5G) New Radio (NR), or Sixth Generation (6G) Radio Access Technologies (RATs).

Clause 72. The first base station of any of clauses 68-71, wherein the information regarding the reference signal includes at least one of a descrambling ID, sequence, or resource allocation of the reference signal.

Clause 73. The first base station of any of clauses 68-72, wherein the one or more processing units are configured to send the information regarding the reference signal to the second base station via a radar server.

Clause 74. The first base station of any of clauses 68-73, wherein the first base station is configured to transmit the communication signals to the second base station as a line of sight (LOS) signal and to the radar target for reflection off the radar target.

Clause 75. A non-transitory computer-readable medium having instructions stored thereon, wherein the instructions, when executed by one or more processing units of a first base station serving as both a radar transmitter and a serving base station for a User Equipment (UE), cause the one or more processing units to perform the following: scheduling communication signals that include downlink data and a reference signal, wherein the reference signal is usable for both downlink data communication and radar sensing; sending information regarding the reference signal to a second base station serving as a radar receiver; and transmitting the communication signals that include the downlink data and the reference signal to the UE and to at least one of the second base station or a radar target.

Clause 76. The non-transitory computer-readable medium of clause 75, wherein the reference signal includes at least one of a channel state information reference signal (CSI-RS), positioning reference signal (PRS), demodulation reference signal (DMRS), or tracking reference signal (TRS).

Clause 77. The non-transitory computer-readable medium of clause 75 or 76, wherein the reference signal includes a Radar Reference Signal (RRS).

Clause 78. The non-transitory computer-readable medium of clause 77, wherein the RRS is used as a Quasi-Colocation (QCL) source for a channel state information reference signal (CSI-RS), a tracking reference signal (TRS), a demodulation reference signal (DMRS), or a Physical Downlink Shared Channel (PDSCH) in Long-Term Evolution (LTE), Fifth Generation (5G) New Radio (NR), or Sixth Generation (6G) Radio Access Technologies (RATs).

Clause 79. The non-transitory computer-readable medium of any of clauses 75-78, wherein the information regarding the reference signal includes at least one of a descrambling ID, sequence, or resource allocation of the reference signal.

Clause 80. The non-transitory computer-readable medium of any of clauses 75-79, wherein sending the information regarding the reference signal to the second base station comprises sending, via a radar server, the information regarding the reference signal to the second base station.

Clause 81. The non-transitory computer-readable medium of any of clauses 75-80, wherein the instructions cause the one or more processing units to transmit the communication signals to the second base station as a line of sight (LOS) signal and to the radar target for reflection off the radar target.

Clause 82. A system comprising: means for scheduling communication signals that include downlink data and a reference signal, wherein the reference signal is usable for both downlink data communication and radar sensing; means for sending information regarding the reference signal to a second base station serving as a radar receiver; and means for transmitting the communication signals that include the downlink data and the reference signal to the UE and to at least one of the second base station or a radar target.

Clause 83. The system of clause 82, wherein the reference signal includes at least one of a channel state information reference signal (CSI-RS), positioning reference signal (PRS), demodulation reference signal (DMRS), or tracking reference signal (TRS).

Clause 84. The system of clause 82 or 83, wherein the reference signal includes a Radar Reference Signal (RRS).

Clause 85. The system of clause 84, wherein the RRS is used as a Quasi-Colocation (QCL) source for a channel state information reference signal (CSI-RS), a tracking reference signal (TRS), a demodulation reference signal (DMRS), or a Physical Downlink Shared Channel (PDSCH) in Long-Term Evolution (LTE), Fifth Generation (5G) New Radio (NR), or Sixth Generation (6G) Radio Access Technologies (RATs).

Clause 86. A method comprising, by a serving base station: receiving, from a radar server, information regarding a radar beam; determining, based on the information regarding the radar beam, a Quasi-Colocation (QCL) configuration for downlink data reception; sending the QCL configuration for the downlink data reception to a User Equipment (UE); and sending downlink data to the UE, wherein the downlink data is received by the UE based on the QCL configuration.

Clause 87. The method of clause 86, further comprising: receiving, by the UE, the information regarding the radar beam; and determining, by the UE based on the information regarding the radar beam, a default receive beam for receiving the downlink data, wherein the default receive beam does not collide with the radar beam.

Clause 88. The method of clause 86 or 87, wherein the information regarding the radar beam comprises at least one of a boresight direction, a beam width, or an uncertainty of the beam width of the radar beam.

Clause 89. The method of any of clauses 86-88, wherein the QCL configuration comprises beam forming parameters.

Clause 90. The method of any of clauses 86-89, wherein the QCL configuration indicates parameters for a receive beam that does not collide with the radar beam.

Clause 91. The method of any of clauses 86-90, wherein the radar beam is transmitted to the serving base station from a second base station.

Clause 92. The method of clause 91, wherein the serving base station is a radar receiver of a bistatic radar system, and wherein the second base station is a radar transmitter of the bistatic radar system.

Clause 93. The method of any of clauses 86-92, further comprising: sending, by the serving base station, information regarding a second radar beam to the radar server, wherein the second radar beam is transmitted by the serving base station, and wherein the information regarding the second radar beam is used to determine a second QCL configuration for the UE.

Clause 94. The method of any of clauses 86-92, further comprising: determining the QCL configuration based on information regarding a second radar beam, wherein the second radar beam is transmitted by the serving base station.

Clause 95. A serving base station comprising: a wireless communication interface; and one or more processing units configured to: receive, from a radar server, information regarding a radar beam; determine, based on the information regarding the radar beam, a Quasi-Colocation (QCL) configuration for downlink data reception; send, through the wireless communication interface, the QCL configuration for the downlink data reception to a User Equipment (UE); and send, through the wireless communication interface, downlink data to the UE, wherein the downlink data is received by the UE based on the QCL configuration.

Clause 96. The serving base station of clause 95, wherein the information regarding the radar beam comprises at least one of a boresight direction, a beam width, or an uncertainty of the beam width of the radar beam.

Clause 97. The serving base station of clause 95 or 96, wherein the QCL configuration comprises beam forming parameters.

Clause 98. The serving base station of any of clauses 95-97, wherein the QCL configuration indicates parameters for a receive beam that does not collide with the radar beam.

Clause 99. The serving base station of any of clauses 95-98, wherein the radar beam is transmitted to the serving base station from a second base station.

Clause 100. The serving base station of clause 99, wherein the serving base station is a radar receiver of a bistatic radar system, and wherein the second base station is a radar transmitter of the bistatic radar system.

Clause 101. The serving base station of any of clauses 95-100, wherein the one or more processing units are further configured to: send, through the wireless communication interface, information regarding a second radar beam to the radar server, wherein the second radar beam is transmitted by the serving base station, and wherein the information regarding the second radar beam is used to determine a second QCL configuration for the UE.

Clause 102. The serving base station of any of clauses 95-100, wherein the one or more processing units are configured to determine the QCL configuration based on information regarding a second radar beam, and wherein the second radar beam is transmitted by the serving base station.

Clause 103. A non-transitory computer-readable medium having instructions stored thereon, wherein the instructions, when executed by one or more processing units of a first base station serving as both a radar transmitter and a serving base station for a User Equipment (UE), cause the one or more processing units to perform the following: receiving, from a radar server, information regarding a radar beam; determining, based on the information regarding the radar beam, a Quasi-Colocation (QCL) configuration for downlink data reception; sending the QCL configuration for the downlink data reception to a User Equipment (UE); and sending downlink data to the UE, wherein the downlink data is received by the UE based on the QCL configuration.

Clause 104. The non-transitory computer-readable medium of clause 103, wherein the information regarding the radar beam comprises at least one of a boresight direction, a beam width, or an uncertainty of the beam width of the radar beam.

Clause 105. The non-transitory computer-readable medium of clause 103 or 104, wherein the QCL configuration comprises beam forming parameters.

Clause 106. The non-transitory computer-readable medium of any of clauses 103-105, wherein the QCL configuration indicates parameters for a receive beam that does not collide with the radar beam.

Clause 107. The non-transitory computer-readable medium of any of clauses 103-106, wherein the radar beam is transmitted to the serving base station from a second base station.

Clause 108. The non-transitory computer-readable medium of clause 107, wherein the serving base station is a radar receiver of a bistatic radar system, and wherein the second base station is a radar transmitter of the bistatic radar system.

Clause 109. The non-transitory computer-readable medium of any of clauses 103-108, wherein the instructions further cause the one or more processing units to: send information regarding a second radar beam to the radar server, wherein the second radar beam is transmitted by the serving base station, and wherein the information regarding the second radar beam is used to determine a second QCL configuration for the UE.

Clause 110. The non-transitory computer-readable medium of any of clauses 103-108, wherein the instructions further cause the one or more processing units to: determine the QCL configuration based on information regarding a second radar beam, wherein the second radar beam is transmitted by the serving base station.

Clause 111. A system comprising: a wireless communication interface configured to receive, from a radar server, information regarding a radar beam; means for determining, based on the information regarding the radar beam, a Quasi-Colocation (QCL) configuration for downlink data reception; means for sending the QCL configuration for the downlink data reception to a User Equipment (UE); and means for sending downlink data to the UE, wherein the downlink data is received by the UE based on the QCL configuration.

Clause 112. The system of clause 111, wherein the information regarding the radar beam comprises at least one of a boresight direction, a beam width, or an uncertainty of the beam width of the radar beam.

Clause 113. The system of clause 111 or 112, wherein the QCL configuration comprises beam forming parameters.

Clause 114. The system of any of clauses 111-113, wherein the QCL configuration indicates parameters for a receive beam that does not collide with the radar beam.

What is claimed is:

1. A method comprising, by a first base station:
 sending, to a second base station, a list of resources for uplink data transmission from a user equipment (UE) to the first base station;
 receiving, using resources other than those included in the list of resources, radar signals from the second base station; and
 receiving, using resources included in the list of resources, the uplink data from the UE.

2. The method of claim 1, wherein the list of resources includes a list of frequency domain and time domain resources for transmitting radio frequency signals carrying the uplink data.

3. The method of claim 1, wherein sending the list of resources to the second base station comprises sending, via a radar server, the list of resources to the second base station.

4. The method of claim 3, further comprising sending a respective priority level associated with each resource of the list of resources to the radar server.

5. The method of claim 1, wherein the uplink data includes Ultra-Reliable Low-Latency Communication (URLLC) data.

6. The method of claim 1, wherein the first base station is a serving base station for the UE and is also a radar receiver of a bistatic radar system, and wherein the second base station is a radar transmitter of the bistatic radar system.

7. The method of claim 1, wherein the first base station receives the uplink data through wireless communication according to Long-Term Evolution (LTE), Fifth Generation (5G) New Radio (NR), or Sixth Generation (6G) Radio Access Technologies (RATs).

8. The method of claim 1, wherein resources used by the first base station to receive the uplink data and resources used by the first base station to receive the radar signals differ with respect to at least one of slots, symbols, or subcarriers.

9. A first base station comprising:
a wireless communication interface operable to receive radio frequency signals carrying data and to receive radar signals from which attributes of a radar target can be determined; and
one or more processing units configured to cause the wireless communication interface to:
send, to a second base station, a list of resources for uplink data transmission from a user equipment (UE) to the first base station;
receive, using resources other than those included in the list of resources and as part of the radar signals from which the attributes of the radar target can be determined, radar signals from the second base station; and
receive, using resources included in the list of resources, the uplink data from the UE.

10. The first base station of claim 9, wherein the list of resources includes a list of frequency domain and time domain resources for transmitting radio frequency signals carrying the uplink data.

11. The first base station of claim 9, wherein the wireless communication interface sends the list of resources to the second base station via a radar server.

12. The first base station of claim 11, wherein the one or more processing units are configured to cause the wireless communication interface to send a respective priority level associated with each resource of the list of resources to the radar server.

13. The first base station of claim 12, wherein the wireless communication interface receives the radar signals from the second base station according to a schedule for muting transmission of the radar signals from the second base station, and wherein the schedule is determined by the radar server.

14. The first base station of claim 9, wherein the uplink data includes Ultra-Reliable Low-Latency Communication (URLLC) data.

15. The first base station of claim 9, wherein the first base station is a serving base station for the UE and is also a radar receiver of a bistatic radar system, and wherein the second base station is a radar transmitter of the bistatic radar system.

16. The first base station of claim 9, wherein the wireless communication interface is configured to receive the uplink data through wireless communication according to Long-Term Evolution (LTE), Fifth Generation (5G) New Radio (NR), or Sixth Generation (6G) Radio Access Technologies (RATs).

17. The first base station of claim 9, wherein resources used by the first base station to receive the uplink data and resources used by the first base station to receive the radar signals differ with respect to at least one of slots, symbols, or subcarriers.

18. A method comprising, by a first base station:
receiving, from a radar server, information regarding a radar beam transmitted by a second base station serving as a radar transmitter;
determining, using the information regarding the radar beam, parameters of a receive beam for receiving uplink data from a User Equipment (UE), wherein the parameters are determined such that the receive beam does not collide with the radar beam;
receiving, using the receive beam, the uplink data from the UE; and
receiving the radar beam from the second base station.

19. The method of claim 18, wherein the information regarding the radar beam includes at least one of a boresight direction, a beam width, or an uncertainty of the beam width of the radar beam.

20. The method of claim 18, further comprising determining, based on the information regarding the radar beam, a default receive beam for uplink data communication, wherein the default receive beam does not collide with the radar beam.

21. The method of claim 18, wherein:
receiving the uplink data using the receive beam comprises configuring an antenna array to form the receive beam, and
determining the parameters of the receive beam comprises determining at least one of a time delay, a phase delay, a power level, or an on/off state of an antenna element in the antenna array, to set a receiving angle or beam width of the receive beam.

22. The method of claim 18, wherein the information regarding the radar beam is received by the first base station as assistance data from the radar server.

23. The method of claim 18, wherein the uplink data and the radar beam are received concurrently.

24. The method of claim 18, wherein the radar beam corresponds to a line of sight (LOS) signal, the method further comprising:
receiving an echo signal, the echo signal being a radar signal transmitted from the second base station and reflected off a radar target; and
processing the LOS signal and the echo signal to determine one or more attributes of the radar target.

25. A method comprising, by a first base station serving as both a radar transmitter and a serving base station for a User Equipment (UE):
scheduling communication signals that include downlink data and a reference signal, wherein the reference signal is usable for both downlink data communication and radar sensing;
sending information regarding the reference signal to a second base station serving as a radar receiver; and
transmitting, by the first base station, the communication signals that include the downlink data and the reference signal to the UE and to at least one of the second base station or a radar target.

26. The method of claim 25, wherein the reference signal includes at least one of a channel state information reference signal (CSI-RS), positioning reference signal (PRS), demodulation reference signal (DMRS), or tracking reference signal (TRS).

27. The method of claim 25, wherein the reference signal includes a Radar Reference Signal (RRS).

28. The method of claim 25, wherein the information regarding the reference signal includes at least one of a descrambling ID, sequence, or resource allocation of the reference signal.

29. The method of claim 25, wherein sending the information regarding the reference signal to the second base station comprises sending, via a radar server, the information regarding the reference signal to the second base station.

30. A method, comprising:
sending a list of resources from a first base station to a second base station, wherein the list of resources are configured for uplink data transmission from a user equipment (UE) to the first base station, and the uplink data transmission being received using resources included in the list of resources;

receiving radar signals at the first base station from the second base station, wherein the radar signals are received using resources other than those included in the list of resources;

determining a schedule for muting transmission of the radar signals based on a priority level associated with each resource of the list of resources; and sending the schedule to the first base station.

31. The method of claim 30, wherein the list of resources from the first base station to the second base station are sent via a radar server, and the schedule for muting transmission of the radar signals is determined by the radar server.

* * * * *